US011334034B2

(12) United States Patent
Matsuoka et al.

(10) Patent No.: US 11,334,034 B2
(45) Date of Patent: May 17, 2022

(54) ENERGY EFFICIENCY PROMOTING SCHEDULE LEARNING ALGORITHMS FOR INTELLIGENT THERMOSTAT

(71) Applicant: Google LLC, Mountain View, CA (US)

(72) Inventors: Yoky Matsuoka, Palo Alto, CA (US); Frank E. Astier, Mountain View, CA (US); Rangoli Sharan, Sunnyvale, CA (US); David Sloo, Menlo Park, CA (US); Anthony M. Fadell, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 729 days.

(21) Appl. No.: 15/049,921

(22) Filed: Feb. 22, 2016

(65) Prior Publication Data

US 2016/0169547 A1   Jun. 16, 2016

Related U.S. Application Data

(63) Continuation of application No. 13/656,200, filed on Oct. 19, 2012, now Pat. No. 9,298,196, which is a
(Continued)

(51) Int. Cl.
*G05B 13/02* (2006.01)
*F24F 11/62* (2018.01)
(Continued)

(52) U.S. Cl.
CPC .......... *G05B 13/0265* (2013.01); *F24F 11/30* (2018.01); *F24F 11/62* (2018.01);
(Continued)

(58) Field of Classification Search
CPC .... F24F 11/006; F24F 11/001; F24F 11/0076; F24F 11/0012; F24F 2011/0057; F24F 2011/0063; G05B 13/0265; G05D 23/1904
See application file for complete search history.

(56) References Cited

U.S. PATENT DOCUMENTS 2,558,648 A   6/1951 Warner
3,991,357 A   11/1976 Kaminski
(Continued)

FOREIGN PATENT DOCUMENTS

CA   2202008 C   2/2000
CN   106440187 A * 2/2017 ......... G05D 23/1904
(Continued)

OTHER PUBLICATIONS

JP Patent Application No. 2014-537314 filed Oct. 19, 2012, Final Office Action dated Mar. 7, 2017, all pages.
(Continued)

*Primary Examiner* — Rocio Del Mar Perez-Velez
*Assistant Examiner* — Alicia M. Choi
(74) *Attorney, Agent, or Firm* — Kilpatrick Townsend & Stockton LLP

(57) ABSTRACT

A user-friendly programmable thermostat is described that includes receiving an immediate-control input to change set point temperature, controlling temperature according to the set point temperature for a predetermined time interval, and then automatically resetting the set point temperature upon the ending of the predetermined time interval such that the user is urged to make further immediate-control inputs. A schedule for the programmable thermostat is automatically generated based on the immediate-control inputs. Methods are also described for receiving user input relating to the user's preference regarding automatically generating a schedule, and determining whether or not to automatically adopt an automatically generated schedule based on the received user input.

20 Claims, 10 Drawing Sheets

Related U.S. Application Data continuation-in-part of application No. 13/269,501, filed on Oct. 7, 2011, now Pat. No. 8,918,219, which is a continuation-in-part of application No. 13/033,573, filed on Feb. 23, 2011, now Pat. No. 9,223,323.

(60) Provisional application No. 61/550,345, filed on Oct. 21, 2011, provisional application No. 61/429,093, filed on Dec. 31, 2010, provisional application No. 61/415,771, filed on Nov. 19, 2010.

(51) Int. Cl.

| | | |
|---|---|---|
| *F24F 11/30* | (2018.01) | |
| *F24F 11/70* | (2018.01) | |
| *G05D 23/19* | (2006.01) | |
| *F24F 110/10* | (2018.01) | |
| *F24F 11/65* | (2018.01) | |
| *F24F 11/52* | (2018.01) | |
| *F24F 120/20* | (2018.01) | |
| *F24F 11/61* | (2018.01) | |
| *F24F 110/00* | (2018.01) | |
| *F24F 11/64* | (2018.01) | |
| *F24F 11/56* | (2018.01) | |

(52) U.S. Cl.
CPC .......... *F24F 11/70* (2018.01); *G05D 23/1904* (2013.01); *F24F 11/52* (2018.01); *F24F 11/56* (2018.01); *F24F 11/61* (2018.01); *F24F 11/64* (2018.01); *F24F 11/65* (2018.01); *F24F 2110/00* (2018.01); *F24F 2110/10* (2018.01); *F24F 2120/20* (2018.01)

(56) References Cited

U.S. PATENT DOCUMENTS

| | | |
|---|---|---|
| 4,223,831 A | 9/1980 | Szarka |
| 4,316,577 A | 2/1982 | Adams et al. |
| 4,335,847 A | 6/1982 | Levine |
| 4,408,711 A | 10/1983 | Levine |
| 4,460,125 A | 7/1984 | Barker et al. |
| 4,613,139 A | 9/1986 | Robinson, II |
| 4,615,380 A | 10/1986 | Beckey |
| 4,621,336 A | 11/1986 | Brown |
| 4,669,654 A | 6/1987 | Levine et al. |
| 4,674,027 A | 6/1987 | Beckey |
| 4,685,614 A | 8/1987 | Levine |
| 4,741,476 A | 5/1988 | Russo et al. |
| 4,751,961 A | 6/1988 | Levine et al. |
| 4,768,706 A | 9/1988 | Parfitt |
| 4,847,781 A | 7/1989 | Brown, III et al. |
| 4,897,798 A | 1/1990 | Cler |
| 4,971,136 A | 11/1990 | Mathur et al. |
| 4,997,029 A | 3/1991 | Otsuka et al. |
| 5,005,365 A | 4/1991 | Lynch |
| D321,903 S | 11/1991 | Chepaitis |
| 5,065,813 A | 11/1991 | Berkeley et al. |
| 5,088,645 A | 2/1992 | Bell |
| 5,115,967 A | 5/1992 | Wedekind |
| 5,211,332 A | 5/1993 | Adams |
| 5,224,648 A | 7/1993 | Simon et al. |
| 5,224,649 A | 7/1993 | Brown et al. |
| 5,240,178 A | 8/1993 | Dewolf et al. |
| 5,244,146 A | 9/1993 | Jefferson et al. |
| D341,848 S | 11/1993 | Bigelow et al. |
| 5,294,047 A | 3/1994 | Schwer et al. |
| 5,303,612 A | 4/1994 | Odom et al. |
| 5,395,042 A | 3/1995 | Riley et al. |
| 5,415,346 A | 5/1995 | Bishop |
| 5,460,327 A | 10/1995 | Hill et al. |
| 5,462,225 A | 10/1995 | Massara et al. |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,544,036 A | 8/1996 | Brown, Jr. et al. |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,690,277 A | 11/1997 | Flood |
| 5,761,083 A | 6/1998 | Brown, Jr. et al. |
| D396,488 S | 7/1998 | Kunkier |
| 5,779,143 A | 7/1998 | Michaud et al. |
| 5,782,296 A | 7/1998 | Mehta |
| 5,808,294 A | 9/1998 | Neumann |
| 5,808,602 A | 9/1998 | Sellers |
| 5,816,491 A | 10/1998 | Berkeley et al. |
| 5,902,183 A | 5/1999 | D'Souza |
| 5,909,378 A | 6/1999 | De Milleville |
| 5,918,474 A | 7/1999 | Khanpara et al. |
| 5,924,486 A | 7/1999 | Ehlers et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,066,843 A | 5/2000 | Scheremeta |
| D428,399 S | 7/2000 | Kahn et al. |
| 6,093,914 A | 7/2000 | Diekmann et al. |
| 6,095,427 A | 8/2000 | Hoium et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,311,105 B1 | 10/2001 | Budike, Jr. |
| D450,059 S | 11/2001 | Itou |
| 6,318,639 B1 | 11/2001 | Toth |
| 6,349,883 B1 | 2/2002 | Simmons et al. |
| 6,351,693 B1 | 2/2002 | Monie et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,438,241 B1 | 8/2002 | Silfvast et al. |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,574,581 B1 | 6/2003 | Bohrer et al. |
| 6,595,430 B1 | 7/2003 | Shah |
| 6,619,055 B1 | 9/2003 | Addy |
| 6,622,925 B2 | 9/2003 | Earner et al. |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,643,567 B2 | 11/2003 | Kolk et al. |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| 6,785,630 B2 | 8/2004 | Kolk et al. |
| 6,798,341 B1 | 9/2004 | Eckel et al. |
| D497,617 S | 10/2004 | Decombe et al. |
| 6,814,299 B1 | 11/2004 | Carey |
| 6,824,069 B2 | 11/2004 | Rosen |
| 6,851,621 B1 | 2/2005 | Wacker et al. |
| 6,864,879 B2 | 3/2005 | Nojima et al. |
| D503,631 S | 4/2005 | Peabody |

(56) References Cited

U.S. PATENT DOCUMENTS

| | | |
|---|---|---|
| 6,891,838 B1 | 5/2005 | Petite et al. |
| 6,909,921 B1 | 6/2005 | Bilger |
| 6,951,306 B2 | 10/2005 | DeLuca |
| D511,527 S | 11/2005 | Hernandez et al. |
| 6,975,958 B2 | 12/2005 | Bohrer et al. |
| 6,990,821 B2 | 1/2006 | Singh et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,035,805 B1 | 4/2006 | Miller |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,109,970 B1 | 9/2006 | Miller |
| 7,111,788 B2 | 9/2006 | Reponen |
| 7,114,554 B2 | 10/2006 | Bergman et al. |
| 7,135,965 B2 | 11/2006 | Chapman, Jr. et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,149,729 B2 | 12/2006 | Kaasten et al. |
| 7,152,806 B1 | 12/2006 | Rosen |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,188,482 B2 | 3/2007 | Sadegh et al. |
| 7,222,494 B2 | 5/2007 | Peterson et al. |
| 7,222,800 B2 | 5/2007 | Wruck |
| 7,225,054 B2 | 5/2007 | Amundson et al. |
| 7,225,057 B2 | 5/2007 | Froman et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,289,887 B2 | 10/2007 | Rodgers |
| 7,299,996 B2 | 11/2007 | Garrett et al. |
| 7,302,642 B2 | 11/2007 | Smith et al. |
| 7,333,880 B2 | 2/2008 | Brewster et al. |
| 7,346,467 B2 | 3/2008 | Bohrer et al. |
| D566,587 S | 4/2008 | Rosen |
| 7,379,791 B2 | 5/2008 | Tamarkin et al. |
| RE40,437 E | 7/2008 | Rosen |
| 7,418,663 B2 | 8/2008 | Pettinati et al. |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen et al. |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Saski et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| D571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,761,189 B2 | 7/2010 | Froman et al. |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,854,389 B2 | 12/2010 | Ahmed |
| 7,861,179 B2 | 12/2010 | Reed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,913,925 B2 | 3/2011 | Ashworth |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,131,207 B2 | 3/2012 | Hwang et al. |
| 8,131,497 B2 | 3/2012 | Steinberg et al. |
| 8,131,506 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| D660,732 S | 5/2012 | Bould et al. |
| 8,174,381 B2 | 5/2012 | Imes et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |

(56) References Cited

U.S. PATENT DOCUMENTS

| | | |
|---|---|---|
| 8,253,704 B2 | 8/2012 | Jang |
| 8,253,747 B2 | 8/2012 | Niles et al. |
| 8,265,798 B2 | 9/2012 | Imes |
| 8,280,536 B1 | 10/2012 | Fadell et al. |
| 8,281,244 B2 | 10/2012 | Neuman et al. |
| 8,292,494 B2 | 10/2012 | Rosa et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| D677,180 S | 3/2013 | Plitkins et al. |
| 8,406,816 B2 | 3/2013 | Marui et al. |
| 8,442,695 B2 | 5/2013 | Imes et al. |
| 8,442,752 B2 | 5/2013 | Wijaya et al. |
| 8,446,381 B2 | 5/2013 | Molard et al. |
| 8,489,243 B2 | 7/2013 | Fadell et al. |
| 8,510,255 B2 | 8/2013 | Fadell et al. |
| 8,606,374 B2 | 12/2013 | Fadell et al. |
| 8,689,572 B2 | 4/2014 | Evans et al. |
| 8,706,270 B2 | 4/2014 | Fadell et al. |
| 8,918,219 B2 | 12/2014 | Sloo et al. |
| 8,950,686 B2 | 2/2015 | Matsuoka et al. |
| 9,223,323 B2 | 12/2015 | Matas et al. |
| 9,298,196 B2 | 3/2016 | Matsuoka et al. |
| 2001/0052052 A1 | 12/2001 | Peng |
| 2002/0005435 A1 | 1/2002 | Cottrell |
| 2002/0022991 A1 | 2/2002 | Sharood et al. |
| 2003/0034898 A1 | 2/2003 | Shamoon et al. |
| 2003/0042320 A1 | 3/2003 | Decker |
| 2003/0112262 A1 | 6/2003 | Adatia et al. |
| 2003/0231001 A1 | 12/2003 | Bruning |
| 2004/0015504 A1 | 1/2004 | Ahad et al. |
| 2004/0034484 A1 | 2/2004 | Solomita, Jr. et al. |
| 2004/0055446 A1 | 3/2004 | Robbin et al. |
| 2004/0067731 A1 | 4/2004 | Brinkerhoff et al. |
| 2004/0074978 A1 | 4/2004 | Rosen |
| 2004/0095237 A1 | 5/2004 | Chen et al. |
| 2004/0164238 A1 | 8/2004 | Xu et al. |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0040250 A1 | 2/2005 | Wruck |
| 2005/0043907 A1 | 2/2005 | Eckel et al. |
| 2005/0055432 A1 | 3/2005 | Rodgers |
| 2005/0071780 A1 | 3/2005 | Muller et al. |
| 2005/0090915 A1 | 4/2005 | Geiwitz |
| 2005/0103875 A1 | 5/2005 | Ashworth et al. |
| 2005/0119766 A1 | 6/2005 | Amundson et al. |
| 2005/0119771 A1* | 6/2005 | Amundson ........ G05B 19/0426 700/86 |
| 2005/0119793 A1 | 6/2005 | Amundson et al. |
| 2005/0120181 A1 | 6/2005 | Arunagirinathan et al. |
| 2005/0128067 A1 | 6/2005 | Zakrewski |
| 2005/0144963 A1* | 7/2005 | Peterson ............ G05D 23/1904 62/178 |
| 2005/0150968 A1 | 7/2005 | Shearer |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194456 A1 | 9/2005 | Tessier et al. |
| 2005/0195757 A1 | 9/2005 | Kidder et al. |
| 2005/0199737 A1 | 9/2005 | de Pauw et al. |
| 2005/0204997 A1 | 9/2005 | Fournier |
| 2005/0279840 A1 | 12/2005 | Schwendinger et al. |
| 2005/0279841 A1 | 12/2005 | Schwendinger et al. |
| 2005/0280421 A1 | 12/2005 | Yomoda et al. |
| 2005/0287424 A1 | 12/2005 | Schwendinger et al. |
| 2006/0000919 A1 | 1/2006 | Schwendinger et al. |
| 2006/0184284 A1 | 8/2006 | Froman et al. |
| 2006/0186214 A1 | 8/2006 | Simon et al. |
| 2006/0196953 A1 | 9/2006 | Simon et al. |
| 2006/0206220 A1 | 9/2006 | Amundson |
| 2006/0208099 A1* | 9/2006 | Chapman, Jr. ........ F24H 9/2007 236/51 |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0084941 A1 | 4/2007 | De Pauw et al. |
| 2007/0114295 A1 | 5/2007 | Jenkins |
| 2007/0115902 A1 | 5/2007 | Shamoon et al. |
| 2007/0132503 A1 | 6/2007 | Nordin |
| 2007/0157639 A1 | 7/2007 | Harrod |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0177857 A1 | 8/2007 | Troost et al. |
| 2007/0220907 A1 | 9/2007 | Ehlers |
| 2007/0221741 A1 | 9/2007 | Wagner et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0246553 A1 | 10/2007 | Morrow et al. |
| 2007/0257120 A1 | 11/2007 | Chapman et al. |
| 2007/0278320 A1 | 12/2007 | Lunacek et al. |
| 2007/0296280 A1 | 12/2007 | Sorg et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0099568 A1 | 5/2008 | Nicodem et al. |
| 2008/0155915 A1 | 7/2008 | Howe et al. |
| 2008/0183337 A1* | 7/2008 | Szabados ........... H05B 37/0254 700/296 |
| 2008/0191045 A1* | 8/2008 | Harter ................ G05D 23/1904 236/91 D |
| 2008/0215240 A1 | 9/2008 | Howard et al. |
| 2008/0221737 A1 | 9/2008 | Josephson et al. |
| 2008/0245480 A1 | 10/2008 | Knight et al. |
| 2008/0256475 A1 | 10/2008 | Amundson et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0024927 A1 | 1/2009 | Schrock et al. |
| 2009/0099699 A1 | 4/2009 | Steinberg et al. |
| 2009/0125151 A1 | 5/2009 | Steinberg et al. |
| 2009/0127078 A1 | 5/2009 | Hostmann et al. |
| 2009/0140056 A1 | 6/2009 | Leen |
| 2009/0140057 A1 | 6/2009 | Leen |
| 2009/0140060 A1 | 6/2009 | Stoner et al. |
| 2009/0140062 A1 | 6/2009 | Amundson et al. |
| 2009/0140064 A1 | 6/2009 | Schultz et al. |
| 2009/0143916 A1 | 6/2009 | Boll et al. |
| 2009/0143918 A1 | 6/2009 | Amundson et al. |
| 2009/0158188 A1 | 6/2009 | Bray et al. |
| 2009/0171862 A1 | 7/2009 | Harrod et al. |
| 2009/0194601 A1 | 8/2009 | Flohr |
| 2009/0195349 A1 | 8/2009 | Frader-Thompson et al. |
| 2009/0215534 A1 | 8/2009 | Wilson et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2009/0297901 A1 | 12/2009 | Kilian et al. |
| 2009/0327354 A1 | 12/2009 | Resnick et al. |
| 2010/0000417 A1 | 1/2010 | Tetreault et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0053464 A1 | 3/2010 | Otsuka |
| 2010/0070084 A1 | 3/2010 | Steinberg et al. |
| 2010/0070085 A1 | 3/2010 | Harrod et al. |

(56) References Cited

U.S. PATENT DOCUMENTS

| | | |
|---|---|---|
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0076605 A1 | 3/2010 | Harrod et al. |
| 2010/0076835 A1 | 3/2010 | Silverman |
| 2010/0084482 A1 | 4/2010 | Kennedy et al. |
| 2010/0106305 A1 | 4/2010 | Pavlak et al. |
| 2010/0106322 A1 | 4/2010 | Grohman |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0131112 A1* | 5/2010 | Amundson ........ G05B 19/0426 700/278 |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1* | 12/2010 | Steinberg ............... F24F 11/006 700/278 |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0016017 A1 | 1/2011 | Carlin et al. |
| 2011/0022242 A1 | 1/2011 | Bukhin et al. |
| 2011/0029488 A1 | 2/2011 | Fuerst et al. |
| 2011/0046756 A1 | 2/2011 | Park |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0082594 A1 | 4/2011 | Dage et al. |
| 2011/0106328 A1 | 5/2011 | Zhou et al. |
| 2011/0151837 A1 | 6/2011 | Winbush, III |
| 2011/0160913 A1 | 6/2011 | Parker et al. |
| 2011/0166828 A1 | 7/2011 | Steinberg et al. |
| 2011/0167369 A1 | 7/2011 | van Os |
| 2011/0181412 A1* | 7/2011 | Alexander ........... G05B 19/042 340/541 |
| 2011/0185895 A1 | 8/2011 | Freen |
| 2011/0202193 A1* | 8/2011 | Craig ..................... G06Q 10/00 700/295 |
| 2011/0282937 A1 | 11/2011 | Deshpande et al. |
| 2011/0290893 A1 | 12/2011 | Steinberg |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0036250 A1 | 2/2012 | Vaswani et al. |
| 2012/0053745 A1 | 3/2012 | Ng |
| 2012/0065783 A1* | 3/2012 | Fadell .................. G05B 13/048 703/7 |
| 2012/0065935 A1 | 3/2012 | Steinberg et al. |
| 2012/0066168 A1 | 3/2012 | Fadell et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0101637 A1 | 4/2012 | Imes et al. |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130547 A1 | 5/2012 | Fadell et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0158350 A1 | 6/2012 | Steinberg et al. |
| 2012/0179300 A1 | 7/2012 | Warren et al. |
| 2012/0186774 A1 | 7/2012 | Matsuoka et al. |
| 2012/0191257 A1 | 7/2012 | Corcoran et al. |
| 2012/0022151 A1 | 8/2012 | Steinberg |
| 2012/0199660 A1 | 8/2012 | Warren et al. |
| 2012/0203379 A1 | 8/2012 | Sloo et al. |
| 2012/0229521 A1 | 9/2012 | Hales, IV et al. |
| 2012/0233478 A1 | 9/2012 | Mucignat et al. |
| 2012/0239207 A1 | 9/2012 | Fadell et al. |
| 2012/0239221 A1 | 9/2012 | Mighdoll et al. |
| 2012/0252430 A1 | 10/2012 | Imes et al. |
| 2012/0296488 A1 | 11/2012 | Dharwada et al. |
| 2013/0024799 A1 | 1/2013 | Fadell et al. |
| 2013/0046397 A1 | 2/2013 | Fadell et al. |
| 2013/0090767 A1 | 4/2013 | Bruck et al. |
| 2013/0099011 A1 | 4/2013 | Matsuoka et al. |
| 2013/0014057 A1 | 10/2013 | Reinpoldt et al. |
| 2014/0005837 A1 | 1/2014 | Fadell et al. |

FOREIGN PATENT DOCUMENTS

| | | |
|---|---|---|
| DE | 3217068 C2 | 10/1983 |
| DE | 19609390 A1 | 9/1997 |
| EP | 207295 | 1/1987 |
| EP | 0444308 A2 | 4/1991 |
| EP | 434926 A2 | 7/1991 |
| EP | 196069 B1 | 12/1991 |
| EP | 720077 A2 | 7/1996 |
| EP | 802471 | 8/1999 |
| EP | 1065079 A2 | 1/2001 |
| EP | 1184804 | 3/2002 |
| EP | 1731984 A1 | 12/2006 |
| EP | 1283396 | 3/2007 |
| EP | 2157492 A2 | 2/2010 |
| EP | 1703356 B1 | 9/2011 |
| GB | 2212317 B | 5/1992 |
| JP | S50-119898 U | 9/1975 |
| JP | 59106311 A | 6/1984 |
| JP | 01252850 A | 10/1989 |
| JP | 09298780 | 11/1997 |
| JP | 10023565 | 1/1998 |
| JP | 2000257939 A | 9/2000 |
| JP | 2002087050 A | 3/2002 |
| JP | 2003-021380 A | 1/2003 |
| JP | 2003-54290 A | 2/2003 |
| JP | 2003054290 A | 2/2003 |
| JP | 2005049062 A | 2/2005 |
| JP | 2006-501965 A | 1/2006 |
| JP | 2006-205752 A | 8/2006 |
| JP | 2007020908 A | 2/2007 |
| JP | 2007-64555 A | 3/2007 |
| JP | 2007-165246 A | 6/2007 |
| JP | 2008-286445 A | 11/2008 |
| JP | 2008-544447 A | 12/2008 |
| JP | 2009302004 A | 12/2009 |
| JP | 2010278539 A | 12/2010 |
| JP | 2011-038718 A | 2/2011 |
| KR | 1020070117874 | 12/2007 |
| NL | 1024986 C2 | 6/2005 |
| WO | 0248851 A2 | 6/2002 |
| WO | 2003/017304 A2 | 2/2003 |
| WO | 2005019740 | 3/2005 |
| WO | 2008054938 | 5/2008 |
| WO | 2009073496 A2 | 6/2009 |
| WO | 2010033563 | 3/2010 |
| WO | 2011128416 A2 | 10/2011 |
| WO | 2011149600 | 12/2011 |
| WO | 2012024534 | 2/2012 |
| WO | 2012068436 | 5/2012 |
| WO | 2012068437 | 5/2012 |
| WO | 2012068453 | 5/2012 |
| WO | 2012068459 | 5/2012 |

(56) References Cited

FOREIGN PATENT DOCUMENTS

| WO | 2012068495 | 5/2012 |
|---|---|---|
| WO | 2012068503 | 5/2012 |
| WO | 2012068507 | 5/2012 |
| WO | 2012068447 | 1/2013 |
| WO | 2013052389 | 4/2013 |
| WO | 2013059671 | 4/2013 |

OTHER PUBLICATIONS

Notice of Grounds of Rejection for Japanese Patent Application No. 2014-537314 dated Jul. 5, 2016, 11 pages. English Translation.
Extended European Search Report dated Mar. 7, 2016, for European Application No. 12841459.6, 8 pages.
Chinese Office Action dated Mar. 3, 2016, for Chinese Application No. 201280051345.9, 6 pages, English Translation.
Notice of Publication dated Feb. 25, 2016, for U.S. Appl. No. 14/933,947, 1 page.
Preliminary Report of Issuance of a New Office Action dated Aug. 7, 2018 in related Japanese Patent Application No. 2014-537314, all pages.
Office action dated Aug. 28, 2018 in related Canadian Patent Application No. 2,852,944, all pages.
Office action dated Sep. 5, 2018 in related Chinese Patent Application No. 201610807014.3, all pages.
Notice of Decision to Grant dated Nov. 27, 2018 in Japanese Patent Application No. 2014-537314, all pages.
Aprilaire Electronic Thermostats Model 8355 User's Manual, Research Products Corporation, 2000, 16 pages.
Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Energy Joule, Ambient Devices, 2011, [retrieved on Aug. 1, 2012], Retrieved from: http://web.archive.org/web/20110723210421/http://www.ambientdevices.com/products/energyjoule.html, 3 pages.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321 and TXH9421 Product Data, Honeywell International, Inc., 68-0311, No Date Given, 126 pages.
Honeywell Prestige THX9321-9421 Operating Manual, Honeywell International, Inc., 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., 2012, 8 pages.
ICY 3815TT-001 Timer-Thermostat Package Box, ICY BV Product Bar Code No. 8717953007902, 2009, 2 pages.
Introducing the New Smart Si Thermostat, Datasheet [online], Ecobee, No Date Given [retrieved on Feb. 25, 2013], Retrieved from the Internet: <URL: https://www.ecobee.com/solutions/home/smart-si/>, all pages.
Lennox ComfortSense 5000 Owner's Guide, Lennox Industries, Inc., 2007, 32 pages.
Lennox ComfortSense 7000 Owner's Guide, Lennox Industries, Inc., 2009, 15 pages.
Lennox iComfort Manual, Lennox Industries, Inc., 2010, 20 pages.
Lux PSPU732T Manual, LUX Products Corporation, No Date Given, 48 pages.
NetX RP32-WIFI Network Thermostat Consumer Brochure, Network Thermostat, No Date Given, 2 pages.
NetX RP32-WIFI Network Thermostat Specification Sheet, Network Thermostat, 2012, 2 pages.
Robertshaw Product Manual 9620, Maple Chase Company, 2001, 14 pages.
Robertshaw Product Manual 9825i2, Maple Chase Company, 2006, 36 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900 Manual, Venstar, Inc., 2008, 113 pages.
Venstar T5800 Manual, Venstar, Inc., No Date Given, 63 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc Operating Manual, 2012, 48 pages.
White Rodgers (Emerson) Model 1F81-261 Installation and Operating Instructions, White Rodgers, No Date Given, 63 pages.
White Rodgers (Emerson) Model IF98EZ-1621 Homeowner's User Guide, White Rodgers, No Date Given, 28 pages.
U.S. Appl. No. 60/512,886, Volkswagen Rotary Knob For Motor Vehicle—English Translation of German Application filed Oct. 20, 2003, all pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.
Arens et al., "Demand Response Enabling Technology Development", Phase I Report: June 2003-Nov. 2005, Jul. 27, P:/DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.

(56) References Cited

OTHER PUBLICATIONS

Auslander et al., "UC Berkeley DR Research Energy Management Group", Power Point Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Novembers, 2009, 6 pages.
Green, "Thermo Heat Tech Cool", Popular Mechanics Electronic Thermostat Guide, Oct. 1985, pp. 155-158.
Loisos et al., "Buildings End-Use Energy Efficiency: Alternatives to Compressor Cooling", California Energy Commision, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Meier et al., "Thermostat Interface Usability: A Survey", Ernest Orlando Lawrence Berkeley National Laboratory, Environmental Energy Technologies Division, Berkeley California, Sep. 2010, pp. 1-73.
Mozer, "The Neural Network House: An Environmental that Adapts to it's Inhabitants", AAAI Technical Report SS-98-02, 1998, pp. 110-114.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort at Home: Design of a Residential Thermostat to Achieve Thermal Comfort, and Save Money and Peak Energy", University of California Berkeley, Mar. 2007, 1 page.
Salus, "S-Series Digital Thermostat Instruction Manual-ST620 Model No. Instruction Manual", www.salus-tech.com, Version 005, Apr. 29, 2010, 24 pages.
Sanford, "iPod (Click Wheel) (2004)", www.apple-history.com [retrieved on Apr. 9, 2012], Retrieved from: http://apple-history.com/ipod, Apr. 9, 2012, 2 pages.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
International Search Report and Written Opinion dated Jan. 23, 2013 in PCT Application No. PCT/US2012/061133, all pages.
International Preliminary Report on Patentability dated Apr. 22, 2014 for International Patent Application PCT/US2012/061133 filed Oct. 19, 2012, 14 pages.
ICY3815TT-001 Timer-Thermostat Package Box, Product Bar Code No. 8717953007902, 2009, 2 pages.
"Advanced Model Owner's Manual", Bay Web Thermostat, manual [online], [retrieved on Nov. 7, 2012], Retrieved from the Internet: <URL:http://www.bayweb.com/wp-content/uploads/BW-WT4-2DOC.pdf>, Oct. 6, 2011, 31 pages.
"Ambient Devices Energy Joule Web Page", http://www.ambientdevices.com/products/energyjoule.html, Cambridge Massachusetts, Ambient Devices, 2011, 2 pages.

"SCE Energy$mart Thermostat Study for Southern California Edison—Presentation of Study Results", Population Research Systems, Project #1010, Nov. 10, 2004, 51 pages.
Bourke, "Server Load Balancing", O'Reilly & Associates, Inc., Aug. 2001, 182 pages.
De Almeida et al., "Advanced Monitoring Technologies for the Evaluatioin of Demand-Side Management Programs", Energy, vol. 19, No. 6, 1994, pp. 661-678.
Gevorkian, "Alternative Energy Systems in Building Design", 2009, pp. 195-200.
Hoffman et al., "Integration of Remote Meter Reading, Load Control and Monitoring of Customers' Installations for Customer Automation with Telephone Line Signalling", Electricity Distribution, 1989. CIRED 1989. 10th International Conference on, May 8-12, 1989, pp. 421-424.
Levy, "A Vision of Demand Response—2016", The Electricity Journal, vol. 19, Issue 8, Oct. 2006, pp. 12-23.
Lopes, "Case Studies in Advanced Thermostat Control for Demand Response", AEIC Load Research Conference, St. Louis, MO, Jul. 2004, 36 pages.
Martinez, "SCE Energy$mart Thermostat Program", Advanced Load Control Alliance, Oct. 5, 2004, 20 pages.
Matty, "Advanced Energy Management for Home Use", IEEE Transaction on Consumer Electronics, vol. 35, No. 3, Aug. 1989, pp. 584-588.
Motegi et al., "Introduction to Commercial Building Control Strategies and Techniques for Demand Response", Demand Response Research Center, May 22, 2007, 35 pages.
White et al., "A Conceptual Model for Simulation Load Balancing", Proc. 1998 Spring Simulation Interoperability Workshop, 1998, 7 pages.
International Patent Application No. PCT/US2012/030084, International Search Report & Written Opinion, dated Jul. 6, 2012, 7 pages.
International Preliminary Report on Patentability dated Apr. 8, 2014 for International Patent Application No. PCT/US2012/058207 filed Sep. 30, 2012, 8 pages.
Detroitborg, "Nest Learning Thermostat: Unboxing and Review", [online], Feb. 2012 [retrieved on Aug. 22, 2013], Retrieved from the Internet: <URL: http://www.youtube.com/watch?v=KrgcOL4oLzc>, all pages.
International Patent Application No. PCT/US2011/061470, International Search Report & Written Opinion, dated Apr. 3, 2012, 11 pages.
International Patent Application No. PCT/US2012/058207, International Search Report & Written Opinion, dated Jan. 11, 2013, 10 pages.
TP-PAC, TP-PHP, TP-NAC, TP-NHP Performance Series AC/HP Thermostat Installation Instructions, Carrier Corp, Sep. 2007, 56 pages.
Chinese Office Action dated Mar. 2, 2015 for Chinese Patent Application No. 201280051345.9 filed Oct. 19, 2012, all pages.
Chinese Office Action dated Oct. 12, 2015 for Chinese Patent Application No. 201280051345.9 filed Oct. 19, 2012, all pages.
Notice of Publication dated Jul. 2, 2014 in Chinese Patent Application No. 201280051345.9, 1 page.
Notice of Decision to Grant dated Jun. 22, 2016 in Chinese Patent Application No. 201280051345.9, all pages.
Notice of European Publication No. dated Jul. 30, 2014 in European Patent Application No. 12841459.6, 1 page.
Notice of Decision to Grant dated Nov. 29, 2018 in European Patent Application No. 12841459.6, 1 page.
Office action dated Jul. 5, 2016 in Japanese Patent Application No. 2014-537314, all pages.
Office action dated Aug. 22, 2017 in Japanese Patent Application No. 2014-537314, all pages.
Office action dated Aug. 7, 2018 in Japanese Patent Application No. 2014-537314, all pages.
Notice of Publication dated Mar. 1, 2017 in Chinese Patent Application No. 201610807014.3, all pages.

\* cited by examiner

ENERGY EFFICIENCY PROMOTING SCHEDULE LEARNING ALGORITHMS FOR INTELLIGENT THERMOSTAT

This application is a continuation of U.S. application Ser. No. 13/656,200 filed Oct. 19, 2012, which claims the benefit of U.S. Prov. Application Ser. No. 61/550,345 filed Oct. 21, 2011. U.S. application Ser. No. 13/656,200 is also a Continuation-in-Part of U.S. application Ser. No. 13/269,501 filed Oct. 7, 2011, now U.S. Pat. No. 8,918,219 issued Dec. 23, 2014, which claims the benefit of U.S. Prov. Application Ser. No. 61/415,771 filed Nov. 19, 2010. U.S. application Ser. No. 13/269,501 also claims the benefit of U.S. Prov. Application Ser. No. 61/429,093 filed Dec. 31, 2010. U.S. application Ser. No. 13/269,501 is also a Continuation-in-Part of U.S. application Ser. No. 13/033,573 filed Feb. 23, 2011, now U.S. Pat. No. 9,223,323 issued Dec. 29, 2015, all of which are incorporated by reference herein.

FIELD

This invention relates generally to the monitoring and control of HVAC systems and/or for other systems for controlling household utilities, and/or resources. More particularly, embodiments of this invention relate to systems, methods and related computer program products for facilitating user-friendly installation and/or operation of a monitoring and control device such as a thermostat.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving settings are not provided, such as the ability to specify a custom temperature swing, i.e., the difference between the desired set temperature and actual current temperature (such as 1 to 3 degrees) required to trigger turn-on of the heating/cooling unit.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat. Thus, there is a need for a thermostat having an improved user interface that is simple, intuitive and easy to use such that the typical user is able to access many of the features such as programming energy-saving profiles.

At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems.

Some attempts have been made to make programing of programmable thermostat more appealing to greater numbers of users. For example, U.S. Pat. Nos. 7,181,317 and 7,634,504 discuss methods for programming configuration information for thermostats wherein a series of interview questions are asked to a user. The user responses to the questions are stored and one or more schedule parameters can be modified based on the user responses. It is believed, however, that such approaches rely heavily or entirely on the user's answers, and as a result will be either wasteful of energy and/or unnecessarily subject the occupants to uncomfortable temperatures when people make mistakes when enter their responses to the questions.

U.S. Pat. No. 7,784,704 discusses a self-programmable thermostat that initially appears to function as an ordinary manual thermostat. The thermostat privately observes and learns a user's manual temperature setting habits and eventually programs itself accordingly. The thermostat looks for patterns, such as three similar manual overrides on consecutive days. Manual set point changes override current programmed set point temperatures. It is believed, however, that further improvement can be made in discussed method's ability to generate energy efficient program schedules.

SUMMARY

According to some embodiments a thermostat is described that includes: a housing; a ring-shaped user-interface component configured to track a rotational input motion from a user; a processing system disposed within the housing and coupled to the ring-shaped user interface component, the processing system being configured to be in operative communication with one or more temperature sensors for receiving ambient air temperature, the processing system further being configured to be in operative communication with an HVAC system control the HVAC system based at least in part on a comparison of the measured ambient temperature and a setpoint temperature, the processing system further being configured to identify a user's desire to immediately control the setpoint temperature value based on the tracked rotational input, the processing system still further being configured to automatically reset the setpoint temperature to a less energy-consuming temperature upon an ending of a predetermined time interval and to generate, a schedule for the thermostat based at least in part on repeated identifications of the user's desire to immediately control the setpoint temperature; and an electronic display coupled to the processing system and configured to display information representative of the identified setpoint temperature value.

According to some embodiments, the electronic display is disposed along a front face of the thermostat housing, the ring-shaped user interface component comprises a mechanically rotatable ring that substantially surrounds the electronic display and is further configured to be inwardly pressable by the user along a direction of an axis of rotation of the rotational input motion, and the mechanically rotatable ring and the housing are mutually configured such that said mechanically rotatable ring moves inwardly along said direction of said axis of rotation when inwardly pressed. According to some embodiments the thermostat housing is generally disk-like in shape with the front face thereof being circular, and wherein the mechanically rotatable ring is generally coincident with an outer lateral periphery of said disk-like shape.

According to some embodiments, the electronic display is further configured to display to a user a notification relating to the generating of the schedule. According to some embodiments in cases where two or more immediate control setpoint temperature changes are identified within a short time interval of less than 90 minutes, the generating of the schedule is based on a latest of the two or more identifications. According to some embodiments, the automatic resetting of the setpoint temperature is to a base setpoint temperature of lower than 68 degrees Fahrenheit at times when the HVAC system uses heating and to a base setpoint temperature of greater than 78 degrees Fahrenheit at time when the HVAC system uses cooling. According to some embodiments the generated schedule is automatically adopted as an active schedule for the programmable thermostat.

According to some embodiments, a method is described for generating a schedule for a programmable thermostat used for control of an HVAC system, the thermostat comprising a housing, a ring-shaped user interface component, a processing system, and an electronic display. The described method includes: accessing an ambient air temperature measured by one or more temperature sensors; detecting and tracking rotational movements of the ring-shaped user-interface component to track at least one rotational input motion of a user; identifying a first setpoint temperature value based on the tracked rotational input motion at a first point in time; controlling the HVAC system based at least in part on a comparison of the measured ambient air temperature and the first setpoint temperature value for a predetermined time interval; automatically resetting the first setpoint temperature upon the ending of the predetermined time interval; identifying a second setpoint temperature value based on the tracked rotational input motion at a second point in time; controlling the HVAC system based at least in part on a comparison of the measured ambient air temperature and the second setpoint temperature value for the predetermined time interval; automatically resetting the second set point temperature upon the ending of the predetermined time interval; generating with the processing system, a schedule for the programmable thermostat based at least in part on the first and second setpoints and the first and second points in time; and displaying information representative of the first and second identified setpoint temperature values on the electronic display.

According to some embodiments, the generated schedule is automatically adopted as an active schedule for the programmable thermostat. According to other embodiments the user is notified of the generated schedule; and user input is received as to whether or not to adopt the generated schedule as an active schedule.

According to some embodiments a thermostat is described that includes: a disk-like housing including a circular front face; an electronic display centrally disposed on the front face; an annular ring member disposed around the centrally disposed electronic display, said annular ring member and said housing being mutually configured such that (i) said annular ring member is rotatable around a front-to-back axis of the thermostat, and (ii) said annular ring member is inwardly pressable along a direction of the front-to back axis; a processing system disposed within the housing and coupled to the annular ring member; the processing system being configured and programmed to dynamically alter a setpoint temperature value based on a user rotation of the annular ring member; the processing system being further configured to be in operative communication with one or more temperature sensors for receiving an ambient air temperature, said processing system being still further configured to be in operative communication with an HVAC system to control the HVAC system based at least in part on a comparison of the measured ambient temperature and the setpoint temperature value; the processing system being still further configured to identify from the annular ring member user input relating to the user's preference regarding automatically generating a schedule and to determine therefrom whether or not to automatically adopt an automatically generated schedule. According to some embodiments, an audio output device is includes that is coupled to said processing system, the thermostat being configured to output synthesized audible ticks through said audio output device in correspondence with user rotation of said mechanically rotatable ring.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner.

As used herein the term "immediate-control input" to a setpoint temperature refers to input from a user to immediately alter the currently active setpoint temperature. Thus an immediate-control input to a thermostat, also sometimes referred to as a "real time" setpoint entry, indicates a user's desire to make an immediate change in the currently setpoint temperature in an HVAC system being controlled by the thermostat. Immediate-control inputs can be made by users either by directly manually interfacing with the thermostat, or by using a remote user interface such as by using a mobile phone, tablet computer and/or web interface on a computer.

As used herein the term "schedule-change input" refers to input from a user or other source to modify a programmed schedule for setpoint changes. Thus a user's schedule-change input to a thermostat, also sometime referred to as a "non-real-time" setpoint entry or change, indicates the user's desire to make changes to one or more of the thermostat's programmed setpoints. In contrast to an immediate control input, where the user desires to immediately effect the currently active setpoint, a schedule-change input indicates a user's desire to make a change (for example temperature or time) to a setpoint that will become active in the future. As in the case of immediate-control inputs, users can make schedule-change inputs either by directly manually interfacing with the thermostat, or by using a remote user interface such as by using a mobile phone, tablet computer and/or web interface on a computer.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparatuses, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
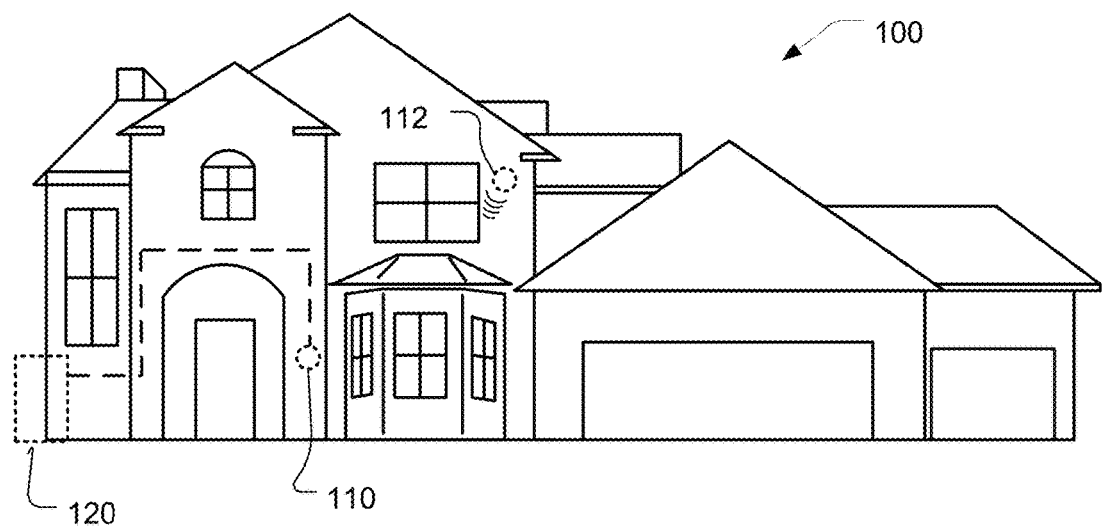
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
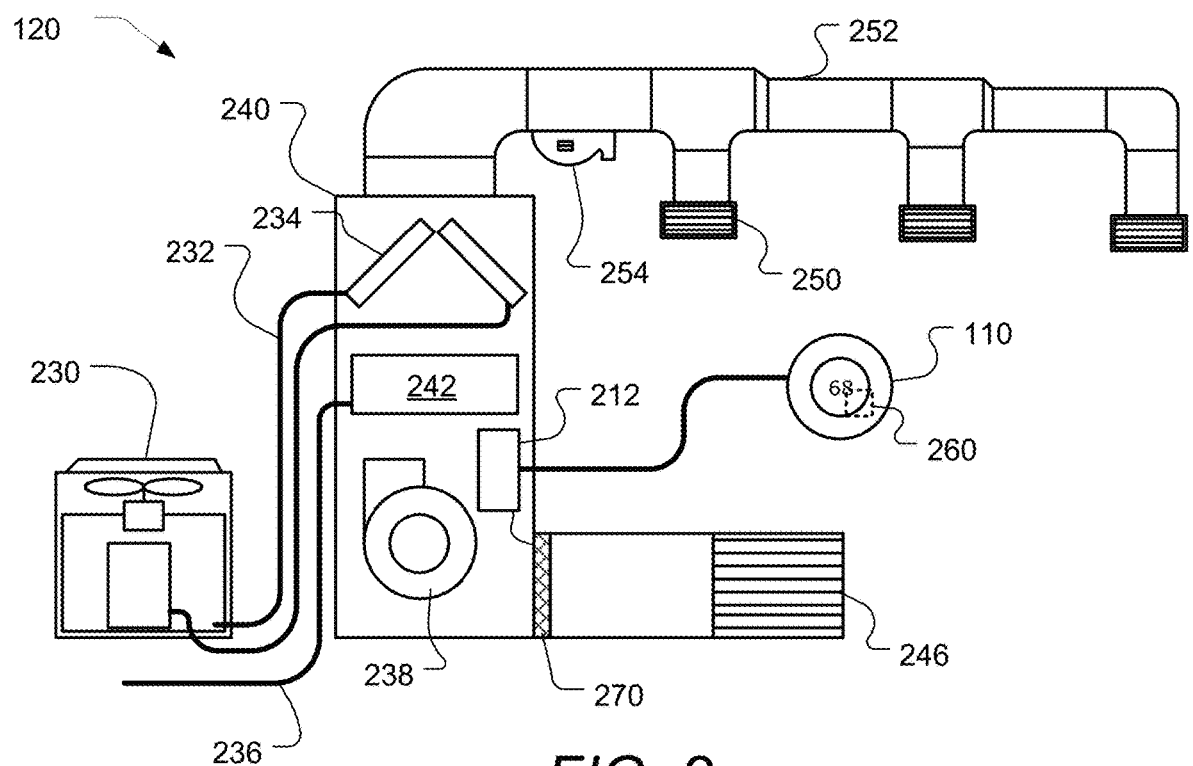
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
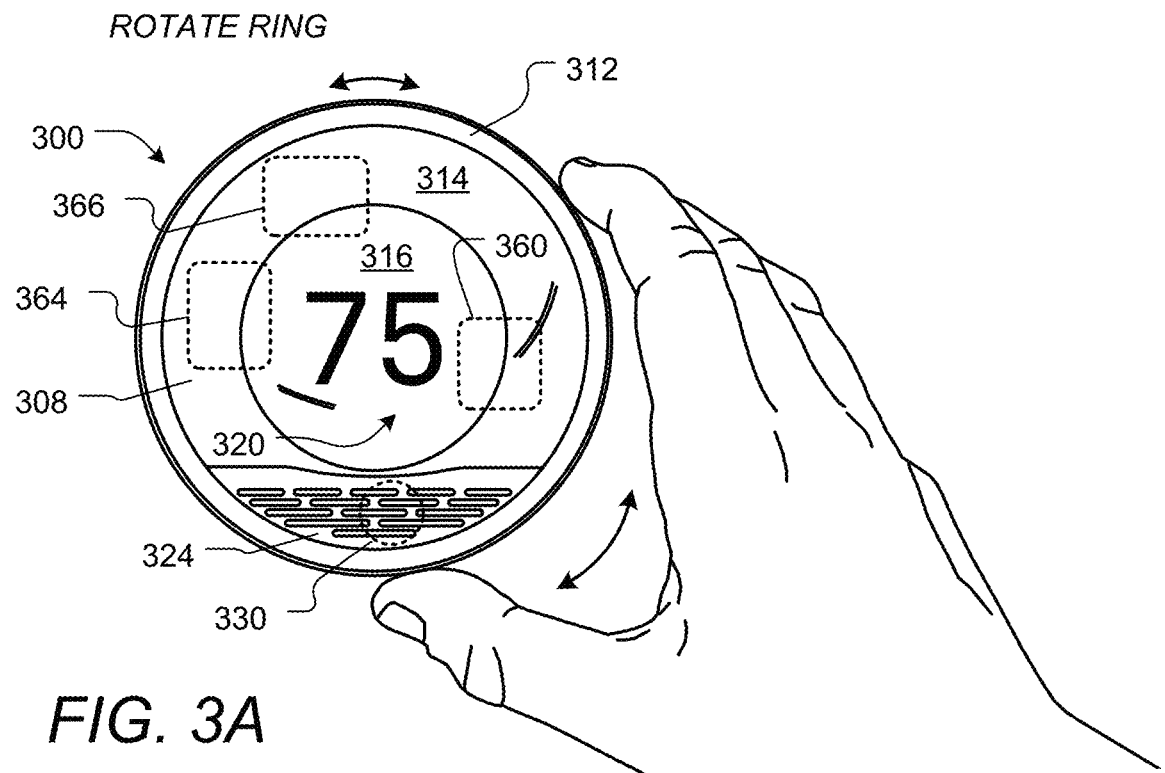
FIGS. 3A-B illustrate a thermostat having a user-friendly interface, according to some embodiments.
Figure 3B:
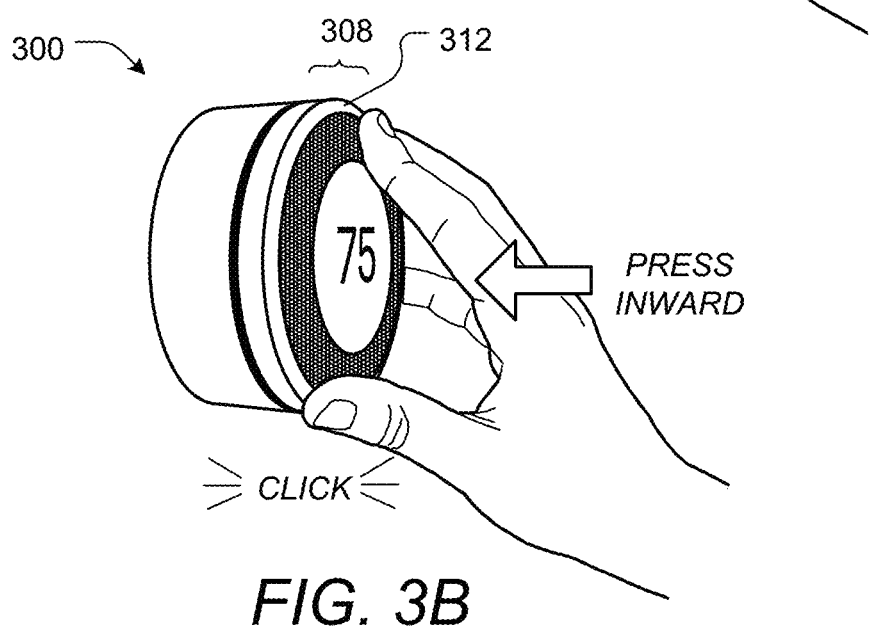

FIGS. 3A-B illustrate a thermostat having a user-friendly interface, according to some embodiments. Unlike so many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over conventional designs by the design of thermostat 300. The thermostat 300 includes control circuitry and is electrically connected to an HVAC system, such as is shown with thermostat 110 in FIGS. 1 and 2. Thermostat 300 is wall mounted and has circular in shape and has an outer rotatable ring 312 for receiving user input. Thermostat 300 has a large frontal display area 314. According to some embodiments, thermostat 300 is approximately 80 mm in diameter. The outer rotating ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 which according to some embodiments is polycarbonate. Also within the rotating ring 312 is a metallic portion 324, preferably having a number of windows as shown. According to some embodiments, the surface of cover 314 and metallic portion 324 form a curved spherical shape gently arcing outward that matches a portion of the surface of rotating ring 312.

According to some embodiments, the cover 314 is painted or smoked around the outer portion, but leaving a central display 316 clear so as to facilitate display of information to users. According to some embodiments, the curved cover 314 acts as a lens which tends to magnify the information being displayed in display 316 to users. According to some embodiments central display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information is shown in FIG. 3A, which are central numerals 320. According to some embodiments, metallic portion 324 has number of openings so as to allow the use of a passive infrared proximity sensor 330 mounted beneath the portion 324. The proximity sensor as well as other techniques can be use used to detect and/or predict occupancy, as is described further in co-pending patent application U.S. Ser. No. 12/881,430, which is incorporated by reference herein. According to some embodiments, occupancy information is used in generating an effective and efficient scheduled program.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" input), and the second being an inward push on the upper cap 308 (FIG. 3B) until an audible and/or tactile "click" occurs (referenced hereafter as an "inward click" input). For further details of suitable user-interfaces and related designs which are employed, according to some embodiments, see co-pending U.S. patent application Ser. Nos. 13/033,573 and 29/386,021, both filed Feb. 23, 2011, and are incorporated herein by reference. The subject matter of the instant patent specification is further related to that of the following commonly assigned applications, each of which is incorporated by reference herein: U.S. Ser. No. 13/279,151 filed Oct. 21, 2011; U.S. Prov. Ser. No. 61/627,996 filed Oct. 21, 2011; U.S. Prov. Ser. No. 61/550,343 filed Oct. 21, 2011; and U.S. Prov. Ser. No. 61/550,346 filed Oct. 21, 2011.

According to some embodiments, the thermostat 300 includes a processing system 360, display driver 364 and a wireless communications system 366. The processing system 360 is adapted to cause the display driver 364 and display area 316 to display information to the user, and to receiver user input via the rotating ring 312. The processing system 360, according to some embodiments, is capable of maintaining and updating a thermodynamic model for the enclosure in which the HVAC system is installed. For further detail on the thermodynamic modeling, see U.S. patent Ser. No. 12/881,463 filed, which is incorporated by reference herein. According to some embodiments, the wireless communications system 366 is used to communicate with devices such as personal computers and/or other thermostats or HVAC system components.

Figure 4A:
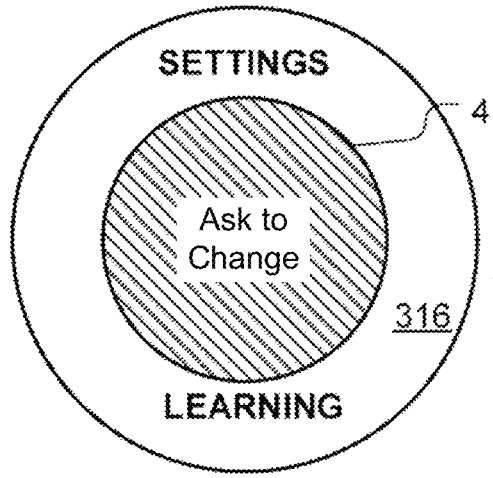
FIGS. 4A-C show aspects of a user interface for a thermostat having learning and self-programming capabilities, according to some embodiments.
Figure 4B:
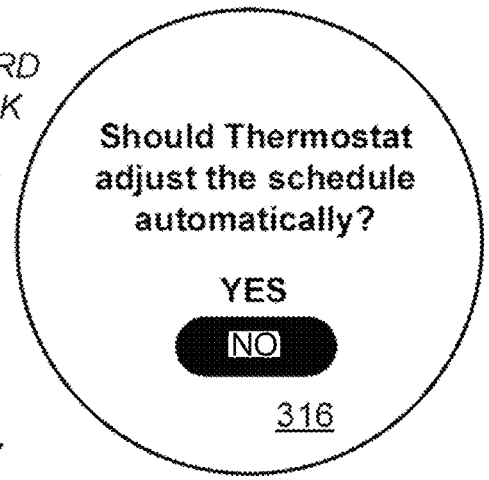
Figure 4C:
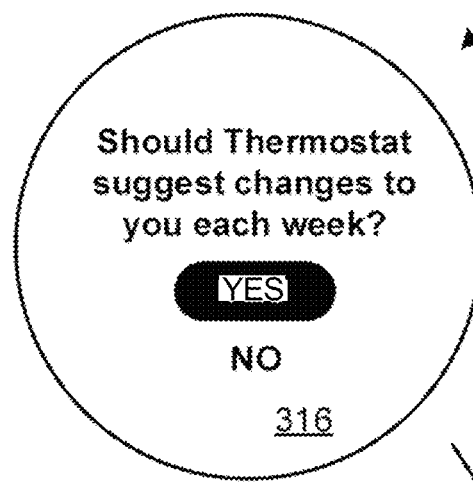

FIGS. 4A-C show aspects of a user interface for a thermostat having learning and self-programming capabilities, according to some embodiments. FIG. 4A shows an example of a display 316 of thermostat 300 described with respect to FIGS. 3A-B. The display 316 indicates that the user is making settings with respect to the thermostat's learning functionality. The colored disk 410 indicates that the learning setting that will be entered, if selected using an inward click, relates to whether the user will be asked about changes made to the program schedule. FIG. 4B shows the display 316 following a user selection using an inward click. In FIG. 4B, the user is asked to if the thermostat should adjust the schedule automatically. Using the rotating ring the and inward click the user selects "yes" or "no." If the user selects "yes," then in step 420 the thermostat automatically generates one or more programs, such as described more fully herein. If the user selects "no," the thermostat, according to some embodiments, the thermostat nevertheless records some or all of the user's adjustments in set temperature and generates suggested schedule changes according to certain criteria (for example, energy or cost savings to the user). According to some embodiments, if the user answers "no" to the question about automatically adjusting the schedule, the thermostat asks the user, as shown in display 316 of FIG. 4C, if the thermostat should suggest changes to the user each week. If the user answers "yes," then in step 422, the thermostat generates a schedule based on learning from the user's immediate-control inputs in combination with other information, and periodically suggests changes to the user according to certain criteria (for example, energy saving or costs savings). If the user answers "no," then in step 424 the thermostat does not generate any program and instead always follows the program set by the user.

Figure 5A:
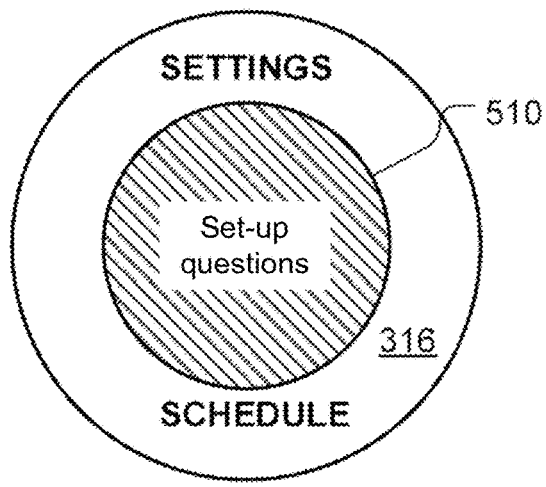
FIGS. 5A-B show aspects of a user interface for generating a program, according to some embodiments.
Figure 5B:
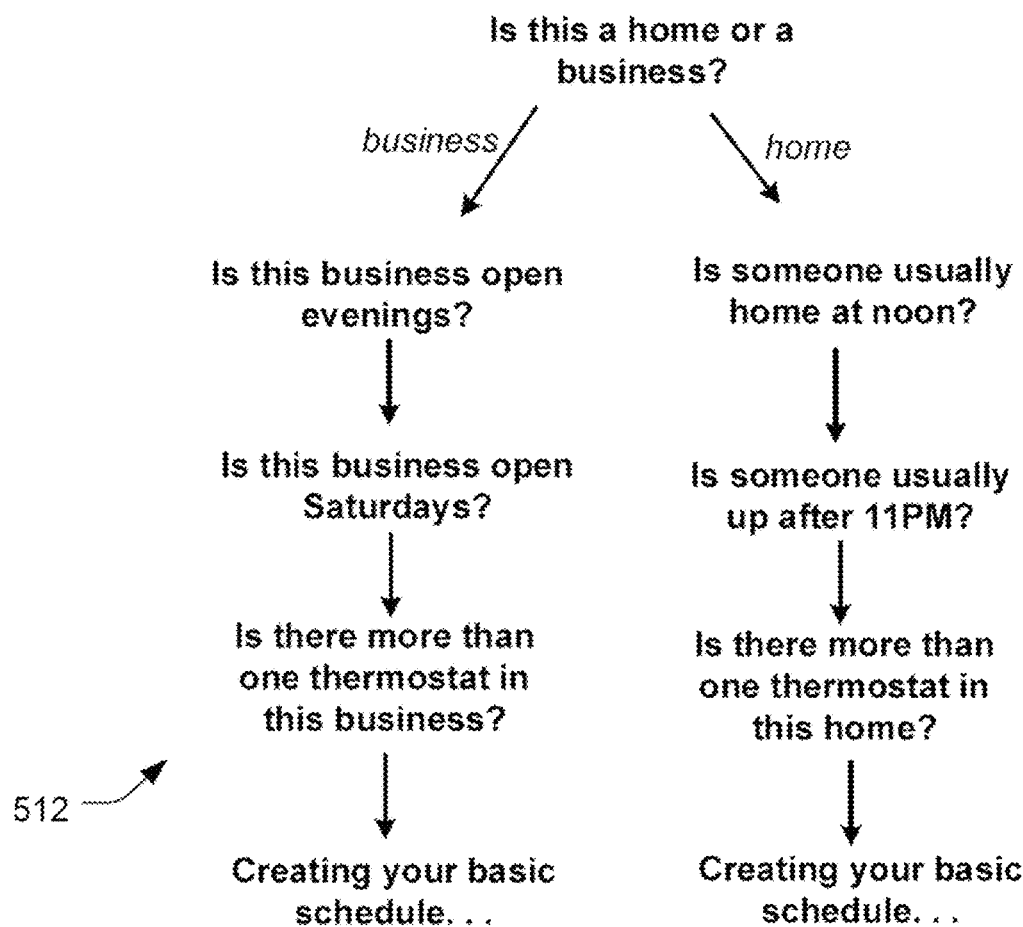

FIGS. 5A-B show aspects of a user interface for generating a program, according to some embodiments. In FIG. 5A, the user can select entering set-up questions relating to the schedule settings as indicated by the colored disk 510, using an inward click input while the thermostat is displays the screen as shown in display 316. FIG. 5B is a flow chart showing questions that can be asked of the user in order to generate a basic schedule, according to some embodiments. As can be seen from the flow chart 512 of FIG. 5B, the user is initially asked if the thermostat is installed in a home or business. Then some basic questions are asked to generate a basic schedule, such as whether the home is usually occupied at noon, is someone usually up after 11 pm, and whether or not there is more than one thermostat in the home. Similar questions are asked is the thermostat is installed in a business. According to some embodiments, a basic schedule is generated based on the answers to the questions in FIG. 5B.

Figure 6A:
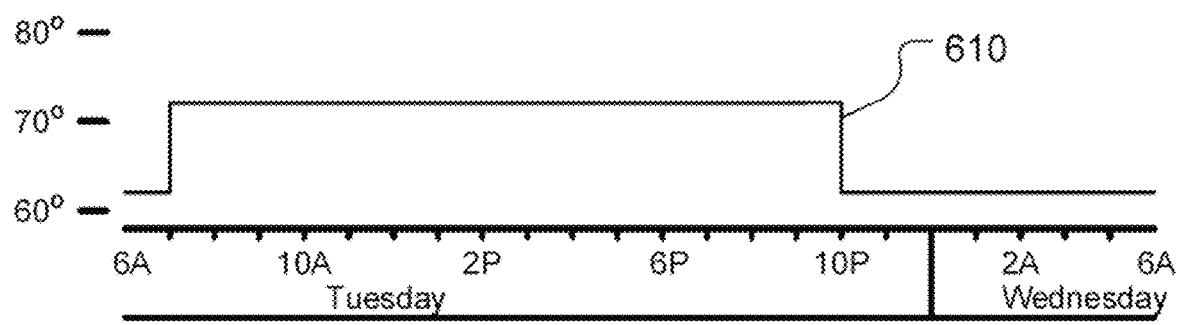
FIGS. 6A-C show examples of basic schedules generated based on answers to basic questions, such as those shown in FIG. 5B, according to some embodiments.
Figure 6B:
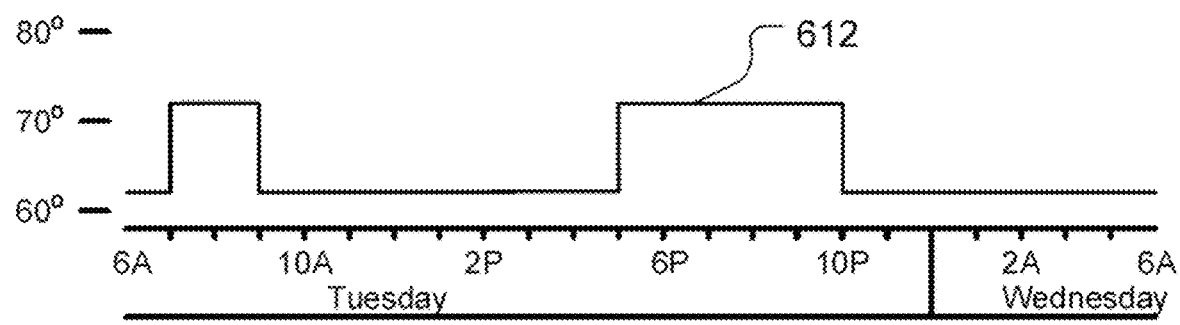
Figure 6C:
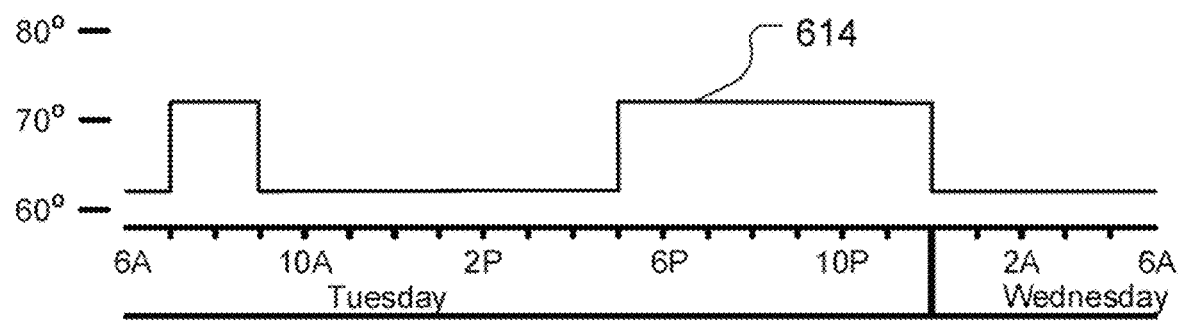

FIGS. 6A-B show examples of basic schedules generated based on answers to basic questions, such as those shown in FIG. 5B, according to some embodiments. In FIG. 6A, curve 610 shows a basic schedule for setpoints from 6 am Tuesday to 6 am Wednesday, which corresponds to a home that the user indicated is occupied during noon and the user indicated that someone is not usually up at 11 pm. As can be seen, the setpoint temperature changes at 7 am from 62 degrees to 72 degrees and then stays at 72 degrees until 10 pm when it changes back to 62 degrees. In FIG. 6B, curve 612 shows a basic schedule that corresponds to a home that the user indicated is not occupied during noon and that someone is not usually up at 11 pm. As can be seen, the set point temperature changes at 7 am from 62 degrees to 72 degrees. Then, at 9 am, the temperature is set back to 62 degrees until 5 pm, when the set point is changed to 72 degrees. The set back from 9 am to 5 pm is due to the user's indication that no one is usually home at noon. In FIG. 6C, curve 614 corresponds to a user's indication that no one is usually home at noon, and some one is usually up at 11 pm. In this case the evening set back time is set to midnight. As can be seen a basic schedule is limited by the simple questions that it is based upon, and as a results the occupants may either be uncomfortable, or energy use and costs may be higher than necessary. For example, the occupants may get up before 7 am, or they may be perfectly comfortable at 68 degrees instead of 72 degrees. According to some embodiments, further questions are asked of the user, such as whether someone is usually up at 6:30 am, or if the occupants are comfortable at 68 degrees. However, each additional question detracts from the simple user interface experience, as well as introduces potential errors based on wrong answers and/or misunderstood questions.

According to some embodiments, after generating the basic schedule based on a few simple questions such as shown in FIGS. 6A-C, the thermostat learns from the user's immediate-control inputs and periodically suggests, or automatically implements schedule changes that meet certain criteria.

Figure 7A:
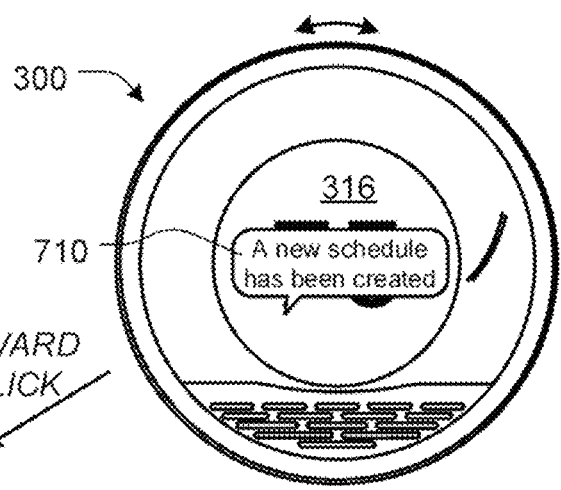
FIGS. 7A-E show aspects of a user interface for a thermostat that generates potential schedule adjustments and suggests them to a user for review and acceptance, according to some embodiments.
Figure 7B:
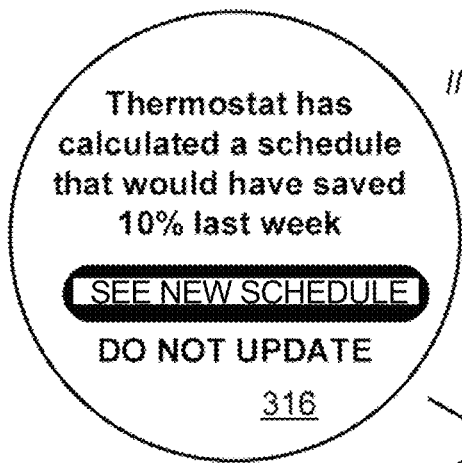
Figure 7C:
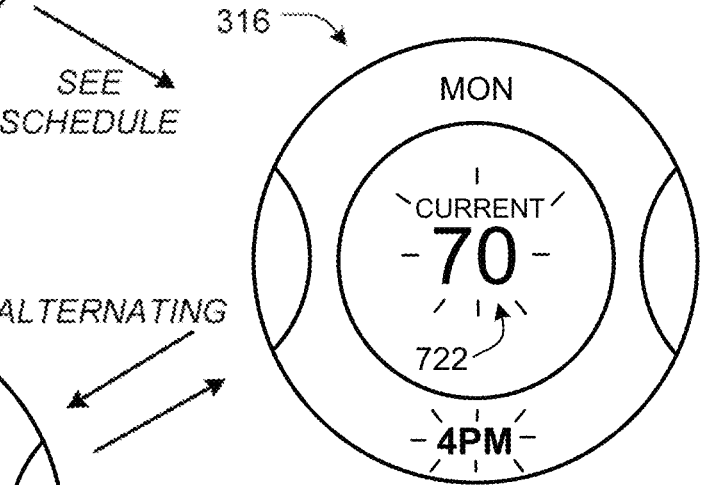
Figure 7D:
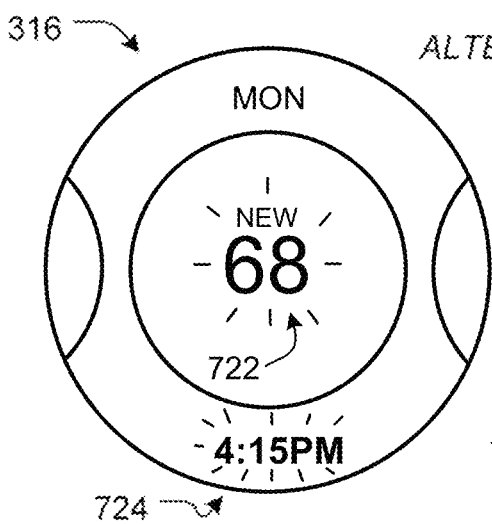
Figure 7E:
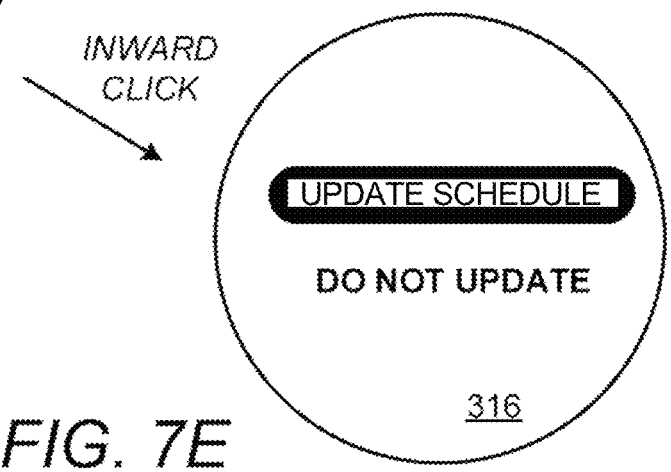

FIGS. 7A-E show aspects of a user interface for a thermostat that generates potential schedule adjustments and suggests them to a user for review and acceptance, according to some embodiments. FIG. 7A show the thermostat 300 with display 316. A message bubble 710 is overlaid on the display 316 to obtain the user's attention. According to some embodiments, one or more proximity sensors (not shown) are used to detect when an occupant is approaching the thermostat 300. Upon sensing an approaching occupant, the message bubble 710 is displayed in order to obtain the user's attention. If the user wishes further information an inward click input leads to the display 316 shown in FIG. 7B. In FIG. 7B, the thermostat indicates to the user that a new schedule has been calculated that is estimated would have saved about 10% of energy costs in the past week. The user has the choice to view the new schedule or reject it. If the user indicates a desire to see the new schedule, then an animation is displayed which alternates between FIG. 7C showing the current schedule, and FIG. 7D showing the proposed new schedule. In FIG. 7C, the current set point temperature 722 is shown and the applicable time 724 is shown below. In FIG. 7D, the new set point temperature 722 is shown and the new time 724 is shown below. If there are further changes to the schedule then those can be accessed by rotating the ring to the right or left. When the user is finished reviewing the new schedule, the user, in FIG. 7E is given the choice to updated the schedule or not.

Figure 8:
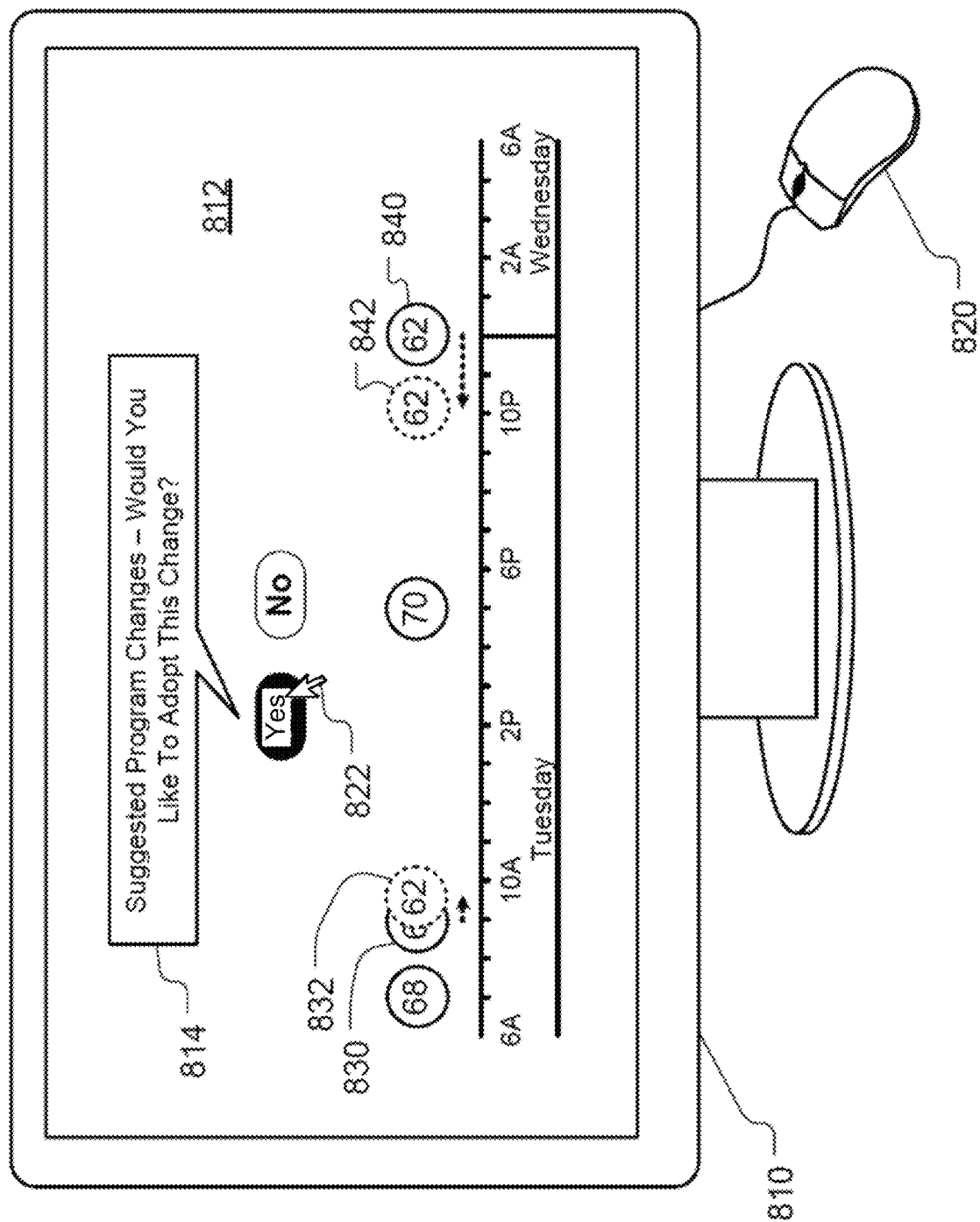
FIG. 8 shows an example of a web-based user interface for a thermostat that generates potential schedule adjustments and suggests them to a user for review and acceptance, according to some embodiments.

FIG. 8 shows an example of a web-based user interface for a thermostat that generates potential schedule adjustments and suggests them to a user for review and acceptance, according to some embodiments. A computer monitor 810 is used to display to a user of the thermostat suggested schedule changes. The user can use a pointing device such as mouse 820 to move a pointer 822 to provide input. In the window 812, the user is asked in bubble 814 whether the displayed schedule change should be adopted. According to some embodiments, further information, such as the estimated amount of energy savings associated with the proposed change can be displayed to aid the user in making a decision. The current schedule is shown in solid circles and the proposed changes are shown in dotted circles. For example, the set back time to 62 degrees in the morning is suggested to be changed from 9 am (shown by solid circle 830) to about 9:30 am (shown by dotted circle 832), and the evening set back to 62 degrees is suggested to be changed from midnight (shown by the solid circle 840) to about 10:15 pm (shown by the dotted circle 842). According to some embodiments, a "snap" button or similar can be provided to the user for the user to easily adopt all the suggested schedule changes. According to some embodiments, the user can also use the interface as shown in FIG. 8 to make their own adjustments and/or accept or reject particular suggested changes by clicking and dragging the circles along the time line, and/or by changing the temperature value within one or more of the circles. According to some embodiments, the interface screen such as shown in FIG. 8 can be displayed at the request of the user, or it can be shown at the request of a central server, such as is common in push technology. According to some embodiments, the decision on when to "push" a notification of a suggested schedule change can be based at least in part on an estimation of energy and/or cost savings being above a predetermined threshold or percentage value.

While simply observing and recording a user's immediate-control inputs can be useful in generating a schedule and/or adjustments to an existing scheduled program, it has been found, unexpectedly, that the thermostat can more effectively learn and generate a scheduled program that makes the user more comfortable while saving energy and cost when the user is periodically urged to input settings to maintain or improve the user's comfort. Bothering the user by periodically urging manual input may at first appear to run counter to a user-friendly experience, but it has been found that this technique very quickly allows the thermostat to generate a schedule that improves user comfort while saving costs, and thus turns out to be very user-friendly overall.

According to some preferred embodiments, therefore, a user's set point change automatically expires after a predetermined amount of time. By automatically resetting or setting back a user's set point adjustment after a predetermined amount of time, the user is urged to repeatedly make set point changes to maintain or improve comfort. As a result, the thermostat is able to learn and generate a much more effective schedule in terms of both comfort for the occupants as well as energy efficiency and cost savings. In this way, the thermostat can learn both the set point temperature, the occupants regard as providing comfort, as well as the times of the day when the user benefits from set point changes, as well as times of the day, such as during periods when the conditioned zone is unoccupied, when the set point temperature can be set back in order to save cost and energy while having a little or no impact on occupant comfort.

Figure 9A:
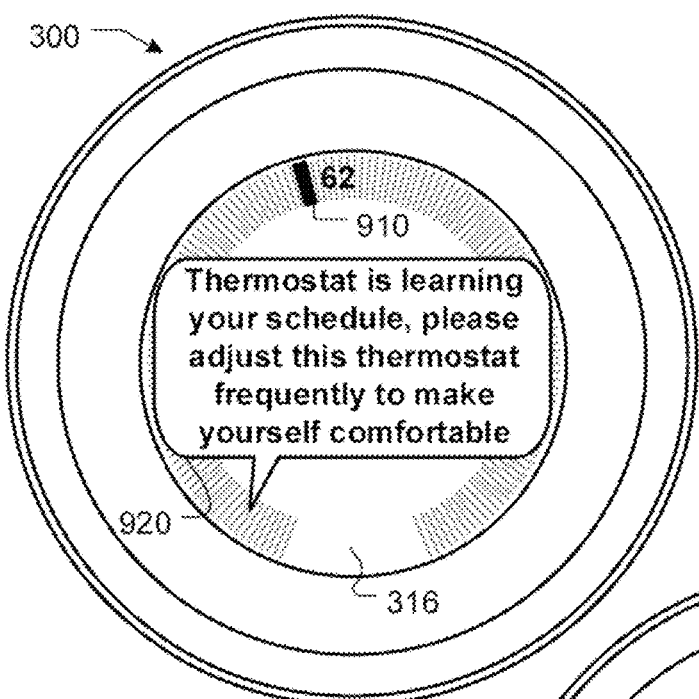
FIGS. 9A-D show aspects of a user interface for a thermostat adapted to learn and generate a schedule based on immediate-control inputs made by the occupants, according to some embodiments.
Figure 9B:
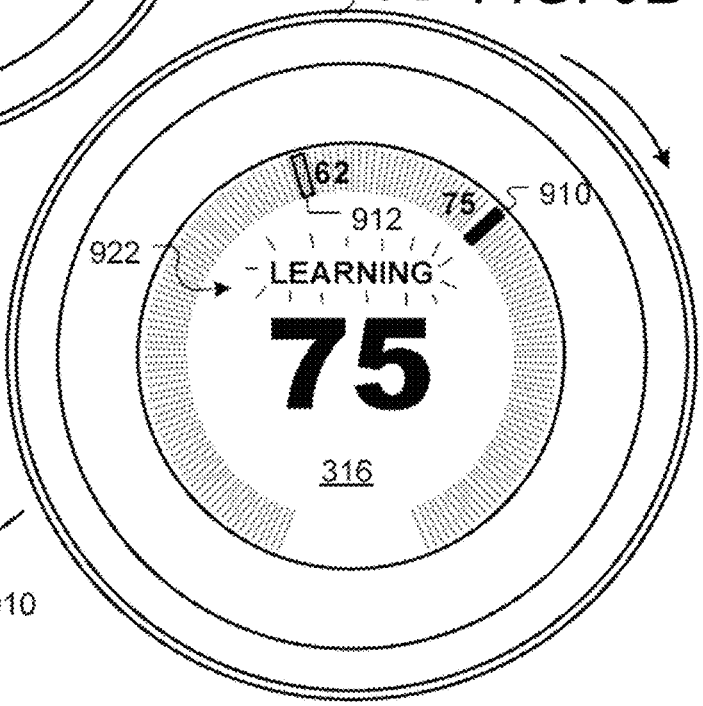
Figure 9C:
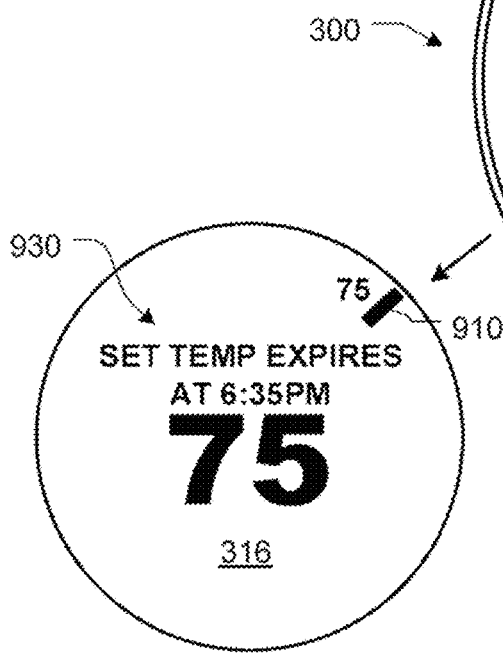
Figure 9D:
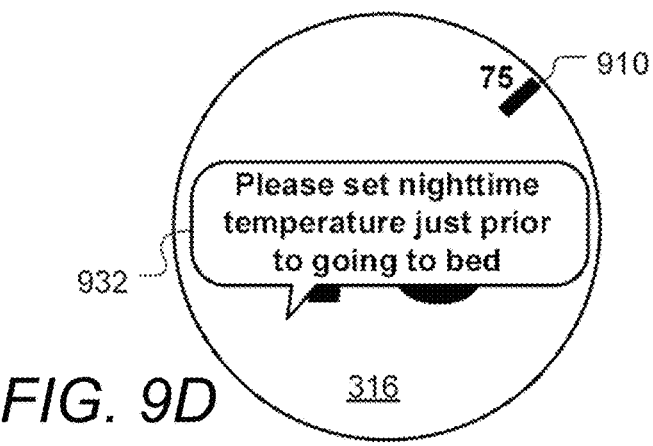

FIGS. 9A-D show aspects of a user interface for a thermostat adapted to learn and generate a schedule based on immediate-control changes made by the occupants, according to some embodiments. In FIG. 9A, the thermostat 300 uses display 316 to inform the user using message bubble 920 that the thermostat is in the process of learning in order to generate a schedule that is suitable for the occupants. The user is asked to adjust the thermostat frequently to make the user comfortable. As shown in FIG. 9A, the current set point temperature is set to 62 degrees F. as indicated by the set point tick 910. In FIG. 9B, a user adjusts the set point temperature, or makes an immediate-control input, to improve comfort by rotating the outer ring 312. The current temperature is 62 degrees F., as indicated by the current temperature tick 912, and the set point has been adjusted to 75, as indicated by the set point tick 910 and by the large central numerals. Additionally, the user is reminded that the thermostat is learning by a flashing "learning" message 922. FIG. 9C shows display 316 following an immediate-control input such as described with respect to FIG. 9B. According to some embodiments, as described above, immediate-control input expires after a predetermined amount of time so as to enhance the ability of the thermostat 300 to learn and generate effective and efficient schedules. The current temperature of 75 degrees F. is displayed in the large central numerals. The set point temperature, which was manually entered as an immediate-control input, is shown by the set point tick 910. The user is informed that the immediate-control input will automatically expire at 6:35 pm in message 930. According to an alternate embodiment, a the message 930 displays a countdown timer showing how many minutes remain until the user's immediate-control input expires. FIG. 9D shows a message bubble 932 that informs the user that a comfortable nighttime temperature should be manually entered just prior to going to bed. According to some embodiments, the message such as shown in FIG. 9D is automatically displayed after a certain time of day (such as 9 pm) when one or more proximity sensors detect when an occupant is approaching the thermostat 300.

It has been found, quite unexpectedly, that in many circumstances the thermostat can more quickly and effectively generate a schedule that balances user comfort with cost and energy savings, when the starting point for gathering the user's input is a "flat-line" or constant temperature that may be quite uncomfortable to many users, but saves significant energy. For example the starting point or initial setting for the thermostat in geographic locations and times of the year when heating is predominantly called for (rather than cooling) is a constant low temperature such as 62 degrees F. In geographic locations and times of year when cooling is predominantly called for the starting "flat line" is, for example, 85 degrees F. This "flat-line" starting point, when combined with automatic re-setting or expiring of the user's immediate-control inputs after a predetermined amount of time has been found to be more effective in many situations than starting with a basic schedule based on a number of basic questions, such as showing in FIG. 5B.

Figure 10A:
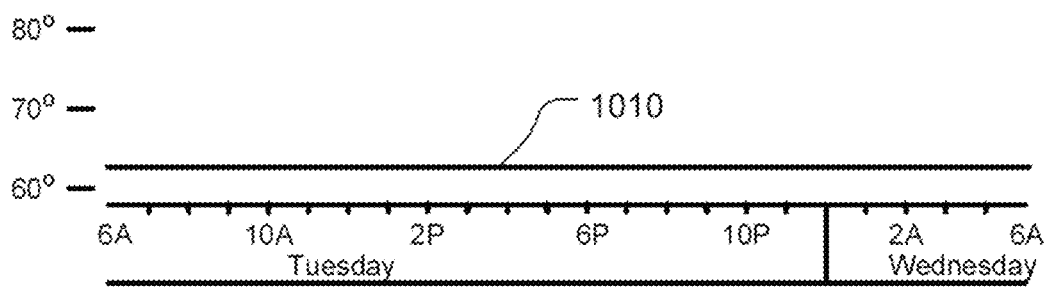
FIGS. 10A-D show examples of automatically generating a schedule using a "flat line" starting point and learning from immediate-control inputs, according to some embodiments.

FIGS. 10A-D show examples of automatically generating a schedule using a "flat line" starting point and learning from immediate-control inputs, according to some embodiments. FIG. 10A shows the starting point schedule 1010 which is a "flat line" of 62 degrees throughout the day. According to some embodiments, the starting point temperature is selected using a number of criteria. Firstly, a determination should be made as to whether heating or cooling is likely to be called for. In cases where the HVAC system being controlled by the thermostat has both heating and cooling functionality, then the determination of which to use can in many or most cases be made using a combination of geographic location (e.g. using postal or ZIP code) which is known or gathered from basic set up information, and the time of year (from the date). In some locations and times of the year, however, it may be unclear whether the user will want to predominantly use heating or cooling. According to some embodiments, the user's first immediate-control input is used in such cases. For example, if the user makes an immediate-control input to set the temperature greater than the ambient temperature, then it is assumed heating is wanted. According to other embodiments, the user is asked using a message bubble or the like, in such cases. Secondly, a determination should be made as to what temperature should be used as the base "flat line." According to some embodiments, a temperature is selected at which many or most occupants would consider at least somewhat uncomfortable such that an occupant would likely wish to make an immediate-control input to improve comfort. The base temperature should not be too uncomfortable, however, since doing so would unnecessarily subject to occupants to discomfort. It has been found that when heating is called for, a base value of between 60 and 64 degrees is suitable for many geographic locations.

Figure 10B:
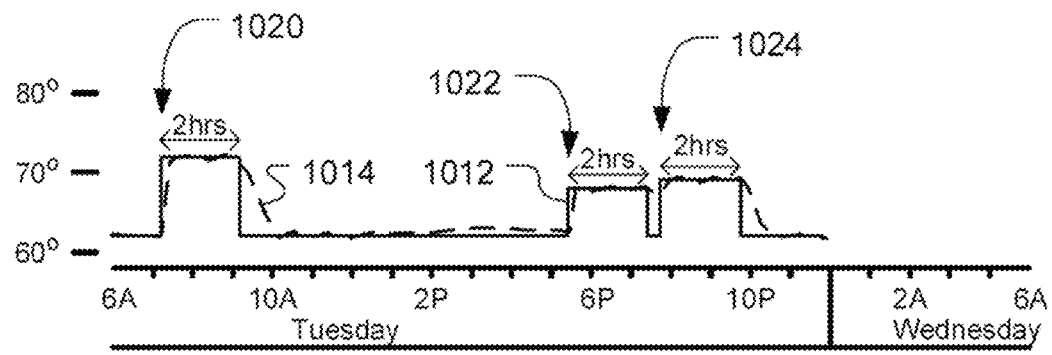

According to some embodiments, the user is notified that the thermostat is trying to learn and generate a schedule, such as using a message bubble as shown in FIG. 9A. In FIG. 10B, the curve 1012 shows the user's immediate-control inputs throughout the day and curve 1014 shows the indoor temperature sensed by the thermostat. A time 1020, about 7:15 am, the user makes an immediate-control input to change the set point temperature from 62 degrees to 72 degrees. According to some embodiments, the set point temperature automatically is set to expire after a predetermined amount of time, which in this example is two hours. Thus, at about 9:15 am, the set point is automatically set back to the base line value of 62 degrees. In this example the user has gone out of the house for the day, and so does not make any immediate-control inputs until the user returns home. At time 1022, about 5:20 pm, the user makes an immediate-control input to adjust the set point to 68 degrees. In this example the predetermined expiry period is two hours, so the set point is automatically set back to 62 degrees at about 7:20 pm. According to some embodiments, the user is informed of the expiry time using a message such as shown in FIG. 9C. Still referring to FIG. 10B, the user at time 1024, about 7:45 pm, the user makes an immediate-control input to adjust the set point temperature to 69 degrees. The set point is automatically set back to 62 degrees after two hours, at about 9:45 pm. In this example, the occupants have gone to bed before or not long after 9:45, so no further immediate-control inputs are made that day.

Figure 10C:
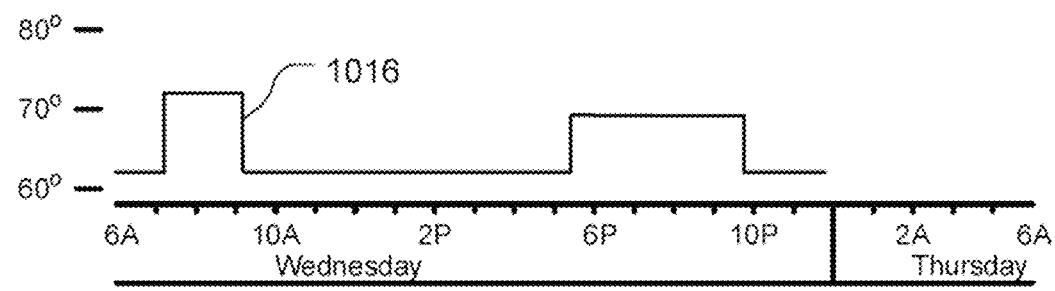

FIG. 10C shows a schedule curve 1016 that has been generated based on the user's immediate-control inputs on the previous day (as shown in FIG. 10B). The temperature is set in the morning at 7:15 am to 72 degrees until it is set back at 9:15 am to 62 degrees. At 5:20, the temperature is set to 69 degrees until it is set back at 9:45 pm to 62 degrees. Note that both the times of day and set point temperatures have been used in generating the schedule shown in FIG. 10C. Additionally, according to some embodiments, the short gap from 7:20, when the temperature was automatically set back, and 7:45 when the user made an immediate-control input, is ignored. Also, the setpoint temperatures in the evening of 68 and 69 degrees where not identical and either an average or the later set temperature was used, in this case 69 degrees.

Figure 10D:
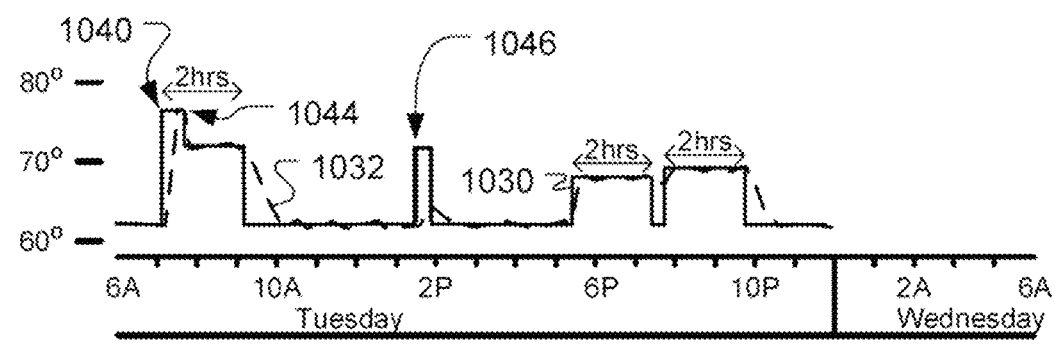

According to some embodiments, the shortest time for a scheduled set point segment is set to 60 minutes. If two immediate-control inputs occur within the 60 minutes of each other, the later will generally be use and the earlier setting or settings will be ignored. FIG. 10D illustrates some example scenarios, with curve 1030 showing the set point temperature of the thermostat as manually and automatically adjusted, and curve 1032 shows the current indoor temperature sensed by the thermostat. At time 1040, about 7:15 am, the an immediate-control input is made by the user change the set point to 77 degrees, but about 30 minutes later at time 1044, about 7:45 am, the user makes an immediate-control input changing the set point to 72 degrees. Since the two immediate-control inputs occurred within a short time (in this case 30 minutes), the first setting is assumed to be erroneous and is ignored for purposed of the automatically generated schedule. Similarly, a time 1046 an immediate-control input is made and about 20 minutes later an immediate-control input resets the temperature to the base line level. Since the setting was effectively cancelled, it is assumed to be erroneous and ignored for purposed of the automatically generated schedule. If, on the other hand, the immediate-control input was not reset for 45 minutes or more, then the immediate-control input is not ignored, according to some embodiments, and segment would be created in the generated schedule for 60 minutes duration. Note that following the described rules, the immediate-control inputs as shown in curve 1030 would lead to an automatically generated schedule as shown by curve 1016 in FIG. 10C.

Figure 11A:
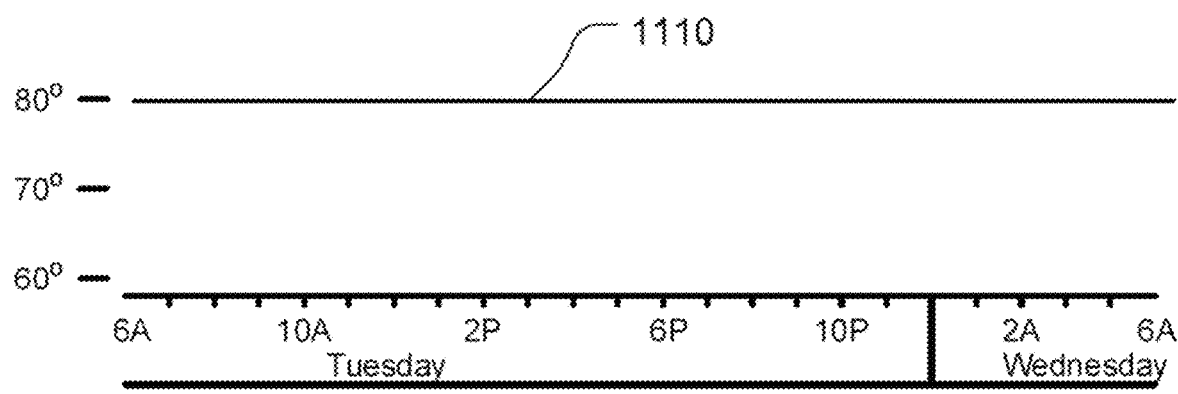
FIGS. 11A-C show examples of automatically generating a schedule using a "flat line" starting point and learning from immediate-control inputs, according to some embodiments.
Figure 11B:
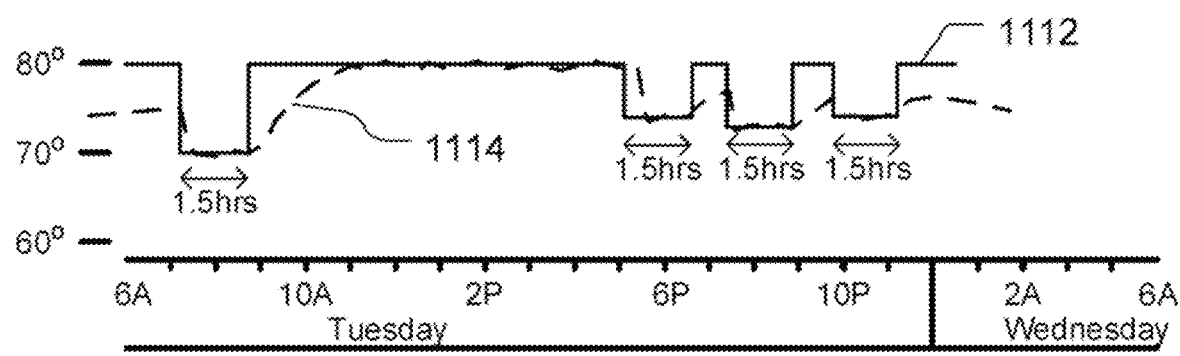
Figure 11C:
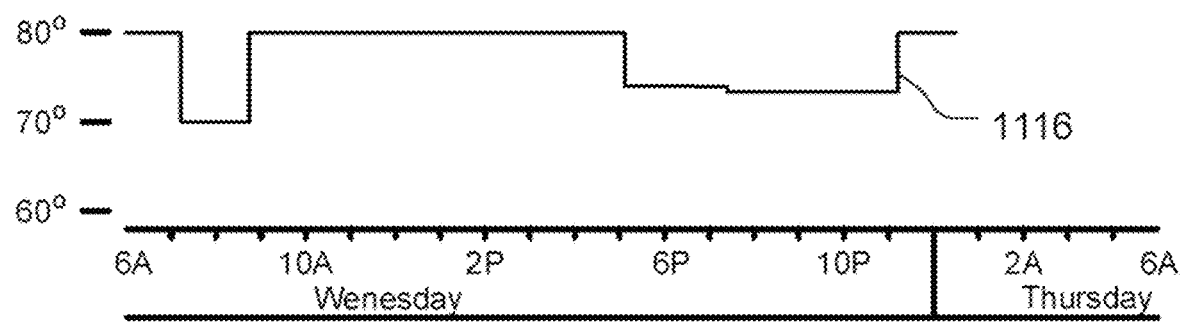

FIGS. 11A-C show examples of automatically generating a schedule using a "flat line" starting point and learning from immediate-control inputs, according to some embodiments. FIG. 11A shows set point curve 1110 that is an example of a "flat line" base value of 80 degrees that is suitable when cooling is believed to be predominantly called for (e.g. based on the geographic location and time of year, as described above). In FIG. 11B, curve 1112 shows the set point settings from immediate-control inputs and automatic resets, and curve 1114 shows the ambient indoor temperature as sensed by the thermostat. In this example, the predetermined expiry time (or reset time) is 1.5 hours. At 7:10 am, the user makes an immediate-control input to 70 degrees. The set point is maintained for 1.5 hours, and at 8:40 am, the set point is automatically set back to 80 degrees. At 5:11 pm the user returns home and makes an immediate-control input to 73 degrees which is maintained for 1.5 hours. At 6:41 pm this set point "expires" and set point is automatically set back to the base value of 80 degrees. At 7:16 pm the user again makes an immediate-control input, but this time to 72 degrees. At 8:46 pm this set point "expires" and the set point is automatically set back to the base value of 80 degrees. At 9:44 pm, the user again makes an immediate-control input to 72 degrees. At 11:14 pm this set point expires, but the user makes no further immediate-control inputs. FIG. 11C shows an example of a schedule 1116 that is automatically generated based on the user input shown in curve 1112 of FIG. 11B. In schedule 1116, a set point of 70 degrees is made between 7:10 am and 8:40 am. During the day, the house is assumed to be unoccupied (since no immediate-control inputs were made on the learning day shown in FIG. 11B), and the temperature is set back to 80 degrees. At 5:11 pm the temperature is set to 73 degrees and then from 7:16 pm to 11:14 pm the temperature is set to 72 degrees.

Note that in the examples shown in FIGS. 10A-D the predetermined expiry time is 2 hours and in the examples shown FIGS. 11A-C the predetermined expiry time is 1.5 hours. It has been found, if the period of time after which the user's immediate-control input is shorter than 30 minutes, this generally cause excessive annoyance to the occupants. On the other hand, if the time is greater than 6 hours, the resulting generated schedule is likely to be wasteful of cost and energy since periods of non-occupancy and/or sleeping are not accurately captured. According to some embodiments the time period is greater than 1 hour and less than or equal to 5 hours.

According to some preferred embodiments, time periods of between 1.5 hours and 3 hours have been found to strike a very good compromise between annoyance to the occupants and energy efficiency of the resulting schedule.

According to some embodiments, the learning process described herein with respect to FIGS. 9-11 can be carried out separately for weekdays versus weekend days. For example, the "flat-line" learning method described can be carried out on a weekday as described which generates a suitable schedule for weekdays. Then, on the first weekend day, a new "flat-line" learning process is started, since it is assumed that for many people the weekday and weekend day schedules are vastly different.

According to some embodiments, the described learning processes continue even after a schedule is activated. For example, following a learning process, a schedule such as shown in FIGS. 10C and/or 11C are generated and activated. The thermostat continues to learn by watching and recording immediate-control inputs. After repeated immediate-control inputs are made, the decision is made as whether and schedule change are automatically implemented or suggested to the user. According to some embodiments, if a user makes similar immediate-control inputs three days in a row (where "similar" is defined, for example, as adjustments within 5 degrees made with 60 minutes of each other), a schedule-change is automatically inputted (and the user notified), or the schedule-change input is suggested to the user. According to some embodiments, estimated energy and/or cost savings is also used as a criterion for implementing or suggesting schedule-change inputs.

According to some embodiments, the continued learning process as described above is used for adjusting, or suggesting improvements to a basic schedule generated from a basic set of questions as shown in and described with respect to FIGS. 5-6. However, it has been found that in many applications, starting with a "flat-line" works to more effectively learn the user's preferences. According to some embodiments, the continued learning process is also carried out in cases where the user has indicated that they wish to manually enter their own scheduled program. In such cases, for example, changes to the schedule can be suggested according to the potential for energy and/or cost savings.

According to some embodiments, occupancy data can also be incorporated in the process of automatically generating a schedule for adoption and/or suggestion to the user. It has been found that occupancy data is particularly useful in cases using automatic set back after a time period, where the time is relatively long-such as three or more hours. In cases where the thermostat is installed in a dwelling that is relatively large, then local-proximity-based occupancy sensing may not be accurate for relatively short periods of time because occupants may simply be in a different part of the dwelling during that time period. However, if there is no occupancy sensed close to the thermostat for greater than two hours, then it is increasingly likely that the dwelling is in fact not occupied.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method for HVAC control schedule learning, comprising:
   receiving, over a learning period of time, a population of immediate-control inputs, wherein:
      each immediate-control input of the population indicates user desire to make an immediate change to a current setpoint temperature being used by a thermostat to control an HVAC system;
      each immediate-control input of the population is selected from the group consisting of:
         a user manually interfacing with a user input component of the thermostat; and
         interaction with a user interface provided via a remote computerized device;
      upon receipt of each of said immediate-control input:
         operating, by the thermostat, the HVAC system according to a temperature defined by that immediate-control input until that immediate-control input expires after a first predetermined time interval during which an additional immediate-control input is not received; and
         upon the immediate-control input expiring after the first predetermined time interval, performing a setback event in which the thermostat operates the HVAC system at a predetermined lower energy setpoint temperature until such time as a next immediate-control input is received, thereby producing a population of setback events over the learning period; and
      after the learning period of time, generating a learned HVAC schedule based on the population of immediate-control inputs and the population of the setback events.

2. The method of claim 1 wherein each setback event is processed to affect the learned HVAC schedule similar to each immediate-control input unless, during the learning period, the setback event was overridden within a defined time period by a subsequent immediate-control input.

3. The method of claim 2, wherein the defined time period is 25 minutes or less.

4. The method of claim 1, wherein the first predetermined time interval is within a range of 1.5 hours to 3 hours.

5. The method of claim 1, wherein the first predetermined time interval is within a range of 30 minutes to 6 hours.

6. The method of claim 1, wherein receiving the population of immediate-control inputs comprises a first immediate-control input and a second immediate-control input being received within a defined time period of each other during the learning period of time; and
   generating the learned HVAC schedule comprises ignoring the first immediate-control input based on less than the defined time period being present between receiving of the first immediate-control input and the second immediate-control input.

7. The method of claim 6, wherein the defined time period is 30 minutes or less.

8. The method of claim 1, wherein the learning period of time corresponds to one or more weekdays; and the method further comprises: controlling, by the thermostat, the HVAC system in accordance with the learned HVAC schedule on weekdays.

9. The method of claim 8 further comprising:
   receiving, over a weekend learning period of time, a second population of immediate-control inputs;
   after the weekend learning period of time, generating a weekend learned HVAC schedule by processing the second population of immediate-control inputs; and
   controlling, by the thermostat, the HVAC system in accordance with the weekend learned HVAC schedule on weekend days.

10. A thermostat that performs HVAC control schedule learning, the thermostat comprising:
    one or more temperature sensors;
    a user interface for receiving input from one or more users;
    control circuitry electrically connected with an HVAC system, wherein the control circuitry allows the thermostat to control operation of the HVAC system;
    one or more processors that communicate with the one or more temperature sensors, the user interface, and the control circuitry; and
    a processor-readable medium communicatively coupled with and readable by the one or more processors and having stored therein processor-readable instructions which, when executed by the one or more processors, cause the one or more processors to:
       receive, over a learning period of time, a population of immediate-control inputs, wherein:
          each immediate-control input of the population indicates user desire to make an immediate change to a current setpoint temperature being used by the thermostat to control the HVAC system;
          each immediate-control input of the population is selected from the group consisting of:
             a user of the one or more users manually interfacing with a user input component of the thermostat; and
             interaction with the user interface provided via a remote computerized device;
          upon receipt of each of said immediate-control input:
             operate the HVAC system according to a temperature defined by that immediate-control input until that immediate-control input expires after a first predetermined time interval during which an additional immediate-control input is not received; and upon the immediate-control input expiring after the first predetermined time interval, perform a setback event in which the thermostat operates the HVAC system at a predetermined setpoint temperature until such time as a next immediate-control input is received, thereby producing a population of setback events over the learning period; and after the learning period of time, generate a learned HVAC schedule using the population of immediate-control inputs and the population of the setback events.

11. The thermostat of claim 10 wherein at least a portion of the population of immediate-control inputs are received by the one or more processors from the user interface of the thermostat.

12. The thermostat of claim 10, further comprising a wireless communication system, wherein at least a portion of the population of immediate-control inputs are received by the one or more processors from a remote device via the wireless communication system.

13. The thermostat of claim 10 wherein each setback event is processed by the one or more processors of the thermostat to create the learned HVAC schedule similar to each immediate-control input unless, during the learning period, the setback event was overridden within a defined time period by a subsequent immediate-control input.

14. The thermostat of claim 10, wherein the first predetermined time interval is within a range of 1.5 hours to 3 hours.

15. The thermostat of claim 10, wherein the first predetermined time interval is within a range of 30 minutes to 6 hours.

16. The thermostat of claim 10, wherein:
the receiving of the population of immediate-control inputs comprises a first immediate-control input and a second immediate-control input being received by the one or more processors within a defined time period of each other during the learning period of time; and
the generating of the learned HVAC schedule comprises ignoring the first immediate-control input based on less than the defined time period being present between receiving of the first immediate-control input and the second immediate-control input.

17. The thermostat of claim 16, wherein the defined time period is 30 minutes or less.

18. The thermostat of claim 10, wherein the learning period of time corresponds to one or more weekdays; and the processor-readable instructions which, when executed by the one or more processors, further cause the one or more processors to control the HVAC system in accordance with the learned HVAC schedule on weekdays.

19. The thermostat of claim 18 wherein the processor-readable instructions, when executed, further cause the one or more processors to:
receive, over a weekend learning period of time, a second population of immediate-control inputs;
after the weekend learning period of time, generate a weekend learned HVAC schedule by processing the second population of immediate-control inputs; and
control the HVAC system using the control circuitry in accordance with the weekend learned HVAC schedule on weekend days.

20. A non-transitory processor-readable medium for HVAC control schedule learning, comprising processor-readable instructions configured to cause one or more processors to:
receive, over a learning period of time, a population of immediate-control inputs, wherein:
each immediate-control input of the population indicates user desire to make an immediate change to a current setpoint temperature being used by a thermostat to control an HVAC system;
each immediate-control input of the population is selected from the group consisting of:
(i) a user manually interfacing with a user input component of the thermostat; and
(ii) interaction with a user interface provided via a remote computerized device;
upon receipt of each of said immediate-control input:
operating the HVAC system according to a temperature defined by that immediate-control input until that immediate-control input expires after a first predetermined time interval; and
upon the immediate-control input expiring after the first predetermined time interval, performing a setback event in which the thermostat operates the HVAC system at a predetermined setpoint temperature until such time as a next immediate-control input is received, thereby producing a population of setback events over the learning period; and
after the learning period of time, generate a learned HVAC schedule based on: the population of immediate-control inputs; and the population of the setback events.

* * * * *